United States Patent
Dimou et al.

(10) Patent No.: US 12,471,081 B2
(45) Date of Patent: Nov. 11, 2025

(54) DEFERRED SEMI-PERSISTENT SCHEDULING (SPS) HYBRID AUTOMATIC REPEAT REQUEST (HARQ) CODEBOOK APPENDING ORDER AND PRIORITY

(71) Applicant: QUALCOMM Incorporated, San Diego, CA (US)

(72) Inventors: Konstantinos Dimou, New York City, NY (US); Yan Zhou, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 483 days.

(21) Appl. No.: 17/958,133

(22) Filed: Sep. 30, 2022

(65) Prior Publication Data
US 2023/0100939 A1    Mar. 30, 2023

Related U.S. Application Data

(60) Provisional application No. 63/251,007, filed on Sep. 30, 2021.

(51) Int. Cl.
*H04W 72/12* (2023.01)
*H04L 1/18* (2023.01)
*H04L 1/1812* (2023.01)
*H04L 5/00* (2006.01)
*H04W 72/1268* (2023.01)

(52) U.S. Cl.
CPC ....... *H04W 72/1268* (2013.01); *H04L 1/1812* (2013.01); *H04L 5/0055* (2013.01)

(58) Field of Classification Search
CPC ... H04W 28/04; H04W 72/04; H04W 72/042; H04W 88/08; H04W 72/1268; H04L 5/0007; H04L 1/1812; H04L 5/0055
USPC ........................................................ 370/329
See application file for complete search history.

(56) References Cited

U.S. PATENT DOCUMENTS

| | | | |
|---|---|---|---|
| 11,646,832 B2 * | 5/2023 | Rastegardoost | H04L 1/1854 370/329 |
| 11,764,908 B2 * | 9/2023 | Kim | H04L 1/1854 370/329 |
| 2022/0183038 A1 * | 6/2022 | Saber | H04L 1/1896 |

(Continued)

FOREIGN PATENT DOCUMENTS

| | | | | |
|---|---|---|---|---|
| JP | WO 2022/202741 A1 * | 9/2022 | | H04W 28/04 |
| WO | WO 2022/200366 A1 * | 9/2022 | | H04W 72/04 |
| WO | WO 2022/214972 A1 * | 10/2022 | | H04L 1/18 |

*Primary Examiner* — Peter G Solinsky
*Assistant Examiner* — Sanjay K Dewan
(74) *Attorney, Agent, or Firm* — Seyfarth Shaw LLP

(57) ABSTRACT

A method of wireless communication by a user equipment (UE) includes deferring transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The method also includes scheduling transmission of a second HARQ codebook at the target PUCCH, the second HARQ codebook having a physical layer (L1) low priority. The method further includes multiplexing the first HARQ codebook and the second HARQ codebook to generate a combined HARQ codebook for transmission in the target PUCCH.

22 Claims, 10 Drawing Sheets

(56) References Cited

U.S. PATENT DOCUMENTS

| | | | |
|---|---|---|---|
| 2023/0078723 A1* | 3/2023 | Kim | H04W 74/0816 |
| | | | 370/329 |
| 2023/0098805 A1* | 3/2023 | Wang | H04W 72/20 |
| | | | 370/329 |
| 2023/0139269 A1* | 5/2023 | MolavianJazi | H04L 5/0094 |
| | | | 370/329 |
| 2023/0141262 A1* | 5/2023 | Huang | H04L 5/0064 |
| | | | 370/336 |
| 2023/0171778 A1* | 6/2023 | Kittichokechai | H04L 1/1671 |
| | | | 370/329 |
| 2023/0198679 A1* | 6/2023 | Bae | H04L 5/0055 |
| | | | 370/329 |
| 2023/0224100 A1* | 7/2023 | Bae | H04L 1/1854 |
| | | | 370/329 |
| 2023/0224949 A1* | 7/2023 | Yin | H04L 5/0055 |
| | | | 370/329 |
| 2023/0224950 A1* | 7/2023 | Yin | H04L 1/1671 |
| | | | 370/329 |
| 2023/0239077 A1* | 7/2023 | Gerami | H04W 72/1273 |
| | | | 370/329 |
| 2024/0107513 A1* | 3/2024 | Gou | H04L 1/1861 |
| 2024/0340889 A1* | 10/2024 | Hugl | H04W 72/21 |
| 2025/0015958 A1* | 1/2025 | Ying | H04W 72/21 |

\* cited by examiner

DEFERRED SEMI-PERSISTENT SCHEDULING (SPS) HYBRID AUTOMATIC REPEAT REQUEST (HARQ) CODEBOOK APPENDING ORDER AND PRIORITY

CROSS-REFERENCE TO RELATED APPLICATION

The present application claims the benefit of U.S. Provisional Patent Application No. 63/251,007, filed on Sep. 30, 2021, and titled "DEFERRED SEMI-PERSISTENT SCHEDULING (SPS) HYBRID AUTOMATIC REPEAT REQUEST (HARQ) CODEBOOK APPENDING ORDER AND PRIORITY," the disclosure of which is expressly incorporated by reference in its entirety.

FIELD OF THE DISCLOSURE

The present disclosure relates generally to wireless communications, and more specifically to deferred semi-persistent scheduling (SPS) hybrid automatic repeat request (HARQ) codebook appending order and physical layer (L1) priority.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes deferring transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The method also includes scheduling transmission of a second HARQ codebook at the target PUCCH, the second HARQ codebook having a physical layer (L1) low priority. In some aspects, the method further includes multiplexing the first HARQ codebook and the second HARQ codebook to generate a combined HARQ codebook for transmission in the target PUCCH.

In other aspects of the present disclosure, a method of wireless communication by a user equipment (UE) includes deferring transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The method also includes deferring transmission of a second HARQ codebook until the target PUCCH, due to potential collision of a second initial SPS PUCCH with a second downlink symbol. The second HARQ codebook has a physical layer (L1) low priority. The method further includes multiplexing the first HARQ codebook and the second HARQ codebook to generate a combined HARQ codebook for transmission in the target PUCCH. The method still further includes sequencing the first HARQ codebook and the second HARQ codebook in the combined HARQ codebook based on a timing of the first initial SPS PUCCH and the second initial SPS PUCCH.

In other aspects of the present disclosure, a method of wireless communication by a base station includes transmitting, to a user equipment (UE), a first semi-persistently scheduled (SPS) physical downlink shared channel (PDSCH). The method also includes transmitting, to the UE, a second SPS PDSCH. The method further includes receiving, from the UE, a combined hybrid automatic repeat request (HARQ) codebook including a deferred transmission of a first HARQ codebook in response to the first SPS PDSCH. The first HARQ codebook has a physical layer (L1) high priority, and a second HARQ codebook in response to the second SPS PDSCH. The second HARQ codebook has a physical layer (L1) low priority.

In other aspects of the present disclosure, a method of wireless communication by a base station includes transmitting, to a user equipment (UE), a first semi-persistently scheduled (SPS) physical downlink shared channel (PDSCH). The method also includes transmitting, to the UE, a second SPS PDSCH. The method further includes receiving, from the UE, a combined hybrid automatic repeat request (HARQ) codebook including a first deferred transmission of a first HARQ codebook in response to the first SPS PDSCH. The first HARQ codebook has a physical layer (L1) high priority, and a second deferred transmission of a second HARQ codebook in response to the second SPS PDSCH. The second HARQ codebook has a physical layer (L1) low priority. The first HARQ codebook and the second HARQ codebook are sequenced in the combined HARQ codebook based on a timing of a first initial SPS PUCCH and a second initial SPS PUCCH.

In other aspects of the present disclosure, a method of wireless communication by a base station includes transmitting, to a user equipment (UE), a first semi-persistently scheduled (SPS) physical downlink shared channel (PDSCH). The method also includes transmitting, to the UE, a second SPS PDSCH, and receiving, from the UE, a combined hybrid automatic repeat request (HARQ) codebook. It includes a deferred transmission of a first HARQ codebook in response to the first SPS PDSCH. The first HARQ codebook has a physical layer (L1) high priority, and a second HARQ codebook in response to the second SPS PDSCH, the second HARQ codebook having a physical layer (L1) low priority. The method further includes jointly decoding the first HARQ codebook and the second HARQ codebook of the combined HARQ codebook based on a physical layer (L1) priority level of the combined HARQ codebook.

Other aspects of the present invention are directed to an apparatus for wireless communication by a user equipment (UE) having a memory and one or more processors coupled to the memory. The processor(s) is configured to defer transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The processor(s) is further configured to schedule transmission of a second HARQ codebook at the target PUCCH, the second HARQ codebook having a physical layer (L1) low priority. In some aspects, the processor(s) is further configured to multiplex the first HARQ codebook and the second HARQ codebook to generate a combined HARQ codebook for transmission in the target PUCCH.

In other aspects of the present disclosure, a non-transitory computer-readable medium having program code recorded thereon is disclosed. The program code is executed by a processor and includes program code to defer transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The program code also includes program code to schedule transmission of a second HARQ codebook at the target PUCCH, the second HARQ codebook having a physical layer (L1) low priority. In some aspects, the program code further includes program code to multiplex the first HARQ codebook and the second HARQ codebook to generate a combined HARQ codebook for transmission in the target PUCCH.

Other aspects of the present disclosure are directed to an apparatus for wireless communication by a user equipment (UE) including means for deferring transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The apparatus also includes means for scheduling transmission of a second HARQ codebook at the target PUCCH. The second HARQ codebook has a physical layer (L1) low priority. In some aspects, the apparatus further includes means for multiplexing the first HARQ codebook and the second HARQ codebook to generate a combined HARQ codebook for transmission in the target PUCCH.

Other aspects of the present disclosure are directed to an apparatus for wireless communication by a user equipment (UE) having a memory and one or more processors coupled to the memory. The processor(s) is configured to defer transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The processor(s) is also configured to defer transmission of a second HARQ codebook until the target PUCCH, due to potential collision of a second initial SPS PUCCH with a second downlink symbol. The second HARQ codebook has a physical layer (L1) low priority. The processor(s) is further configured to multiplex the first HARQ codebook and the second HARQ codebook to generate a combined HARQ codebook for transmission in the target PUCCH. The processor(s) is still further configured to sequence the first HARQ codebook and the second HARQ codebook in the combined HARQ codebook based on a timing of the first initial SPS PUCCH and the second initial SPS PUCCH.

In other aspects of the present disclosure, a non-transitory computer-readable medium with program code recorded thereon is disclosed. The program code is executed by a processor and includes program code to defer transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The program code also includes program code to defer transmission of a second HARQ codebook until the target PUCCH, due to potential collision of a second initial SPS PUCCH with a second downlink symbol. The second HARQ codebook has a physical layer (L1) low priority. The program code further includes program code to multiplex the first HARQ codebook and the second HARQ codebook to generate a combined HARQ codebook for transmission in the target PUCCH. The program code still further includes program code to sequence the first HARQ codebook and the second HARQ codebook in the combined HARQ codebook based on a timing of the first initial SPS PUCCH and the second initial SPS PUCCH.

Other aspects of the present disclosure are directed to an apparatus for wireless communication by a user equipment (UE) including means for deferring transmission of a first hybrid automatic repeat request (HARQ) codebook until a target PUCCH, due to potential collision of a first initial semi-persistently scheduled (SPS) physical uplink control channel (PUCCH) with a first downlink symbol. The first HARQ codebook has a physical layer (L1) high priority. The apparatus also includes means for deferring transmission of a second HARQ codebook until the target PUCCH, due to potential collision of a second initial SPS PUCCH with a second downlink symbol. The second HARQ codebook has a physical layer (L1) low priority. The apparatus further includes means for multiplexing the first HARQ codebook and the second HARQ codebook to generate a combined HARQ codebook for transmission in the target PUCCH. The apparatus still further includes means for sequencing the first HARQ codebook and the second HARQ codebook in the combined HARQ codebook based on a timing of the first initial SPS PUCCH and the second initial SPS PUCCH.

Other aspects of the present disclosure are directed to an apparatus for wireless communication by a base station having a memory and one or more processors coupled to the memory. The processor(s) is configured to transmit, to a user equipment (UE) a first semi-persistently scheduled (SPS) physical downlink shared channel (PDSCH). The processor(s) is also configured to transmit, to the UE, a second SPS PDSCH. The processor(s) is further configured to receive, from the UE, a combined hybrid automatic repeat request (HARQ) codebook including a deferred transmission of a first HARQ codebook in response to the first SPS PDSCH. The first HARQ codebook has a physical layer (L1) high priority. The combined HARQ codebook also includes a second HARQ codebook transmitted in response to the second SPS PDSCH. The second HARQ codebook has a physical layer (L1) low priority.

In other aspects of the present disclosure, a non-transitory computer-readable medium with program code recorded thereon is disclosed. The program code is executed by a processor and includes program code to transmit, to a user equipment (UE) a first semi-persistently scheduled (SPS) physical downlink shared channel (PDSCH). The program code also includes program code to transmit, to the UE, a second SPS PDSCH. The program code further includes program code to receive, from the UE, a combined hybrid automatic repeat request (HARQ) codebook including a deferred transmission of a first HARQ codebook in response to the first SPS PDSCH. The first HARQ codebook has a physical layer (L1) high priority. The combined HARQ codebook also includes a second HARQ codebook transmitted in response to the second SPS PDSCH. The second HARQ codebook has a physical layer (L1) low priority.

Other aspects of the present disclosure are directed to an apparatus for wireless communication by a base station including means for transmitting, to a user equipment (UE), a first semi-persistently scheduled (SPS) physical downlink shared channel (PDSCH). The apparatus also includes means for transmitting, to the UE, a second SPS PDSCH. The apparatus further includes means for receiving, from the UE, a combined hybrid automatic repeat request (HARQ) codebook including a deferred transmission of a first HARQ codebook in response to the first SPS PDSCH. The first HARQ codebook has a physical layer (L1) high priority. The combined HARQ codebook also includes a second HARQ codebook transmitted in response to the second SPS PDSCH. The second HARQ codebook has a physical layer (L1) low priority.

Other aspects of the present disclosure are directed to an apparatus for wireless communication by a base station having a memory and one or more processor(s) coupled to the memory. The processor(s) is configured to transmit, to a user equipment (UE) a first semi-persistently scheduled (SPS) physical downlink shared channel (PDSCH). The processor(s) is also configured to transmit, to the UE, a second SPS PDSCH. The processor(s) is further configured to receive, from the UE, a combined hybrid automatic repeat request (HARQ) codebook including a first deferred transmission of a first HARQ codebook responsive to the first SPS PDSCH. The first HARQ codebook has a physical layer (L1) high priority. The combined HARQ codebook also includes a second deferred transmission of a second HARQ codebook, transmitted in response to the second SPS PDSCH. The second HARQ codebook has a physical layer (L1) low priority. The first HARQ codebook and the second HARQ codebook are sequenced in the combined HARQ codebook based on a timing of a first initial SPS PUCCH and a second initial SPS PUCCH.

In other aspects of the present disclosure, a non-transitory computer-readable medium with program code recorded thereon is disclosure. The program code is executed by a processor and includes program code to transmit, to a user equipment (UE) a first semi-persistently scheduled (SPS) physical downlink shared channel (PDSCH). The program code also includes program code to transmit, to the UE, a second SPS PDSCH. The program code further includes program code to receive, from the UE, a combined hybrid automatic repeat request (HARQ) codebook including a first deferred transmission of a first HARQ codebook responsive to the first SPS PDSCH. The first HARQ codebook has a physical layer (L1) high priority. The combined HARQ codebook also includes a second deferred transmission of a second HARQ codebook transmitted in response to the second SPS PDSCH. The second HARQ codebook has a physical layer (L1) low priority. The first HARQ codebook and the second HARQ codebook are sequenced in the combined HARQ codebook based on a timing of a first initial SPS PUCCH and a second initial SPS PUCCH.

Other aspects of the present disclosure is directed to an apparatus for wireless communication by a base station including means for transmitting, to a user equipment (UE), a first semi-persistently scheduled (SPS) physical downlink shared channel (PDSCH). The apparatus also includes means for transmitting, to the UE, a second SPS PDSCH. The apparatus further includes means for receiving, from the UE, a combined hybrid automatic repeat request (HARQ) codebook including a first deferred transmission of a first HARQ codebook transmitted in response to the first SPS PDSCH, the first HARQ codebook having a physical layer (L1) high priority. The combined HARQ codebook also includes a second deferred transmission of a second HARQ codebook transmitted in response to the second SPS PDSCH, the second HARQ codebook having a physical layer (L1) low priority, wherein the first HARQ codebook and the second HARQ codebook are sequenced in the combined HARQ codebook based on a timing of a first initial SPS PUCCH and a second initial SPS PUCCH.

Other aspects of the present disclosure are directed to an apparatus for wireless communication by a base station having a memory and one or more processor(s) coupled to the memory. The processor(s) is configured to transmit, to a user equipment (UE) a first semi-persistently scheduled (SPS) physical downlink shared channel (PDSCH). The processor(s) is also configured to transmit, to the UE, a second SPS PDSCH. The processor(s) is further configured to receive, from the UE, a combined hybrid automatic repeat request (HARQ) codebook including a deferred transmission of a first HARQ codebook responsive to the first SPS PDSCH. The first HARQ codebook has a physical layer (L1) high priority. The combined HARQ codebook also includes a second HARQ codebook responsive to the second SPS PDSCH. The second HARQ codebook has a physical layer (L1) low priority. The processor(s) is still further configured to jointly decoding the first HARQ codebook and the second HARQ codebook of the combined HARQ codebook based on a physical layer (L1) priority level of the combined HARQ codebook.

In other aspects of the present disclosure, a non-transitory computer-readable medium with program code recorded thereon is disclosed. The program code is executed by a processor and includes program code to transmit, to a user equipment (UE) a first semi-persistently scheduled (SPS) physical downlink shared channel (PDSCH). The program code also includes program code to transmit, to the UE, a second SPS PDSCH. The program code further includes program code to receive, from the UE, a combined hybrid automatic repeat request (HARQ) codebook including a deferred transmission of a first HARQ codebook responsive to the first SPS PDSCH, the first HARQ codebook having a physical layer (L1) high priority. The combined HARQ codebook also includes a second HARQ codebook responsive to the second SPS PDSCH, the second HARQ codebook having a physical layer (L1) low priority. The program code still further includes program code to jointly decode the first HARQ codebook and the second HARQ codebook of the combined HARQ codebook based on a physical layer (L1) priority level of the combined HARQ codebook.

Other aspects of the present disclosure is directed to an apparatus for wireless communication by a base station including means for transmitting, to a user equipment (UE), a first semi-persistently scheduled (SPS) physical downlink shared channel (PDSCH). The apparatus also includes means for transmitting, to the UE, a second SPS PDSCH. The apparatus further includes means for receiving, from the UE, a combined hybrid automatic repeat request (HARQ) codebook including a deferred transmission of a first HARQ codebook responsive to the first SPS PDSCH. The first HARQ codebook has a physical layer (L1) high priority. The combined HARQ codebook also includes a second HARQ codebook responsive to the second SPS PDSCH. The second HARQ codebook has a physical layer (L1) low priority. The apparatus still further includes means for jointly decoding the first HARQ codebook and the second HARQ codebook of the combined HARQ codebook based on a physical layer (L1) priority level of the combined HARQ codebook.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
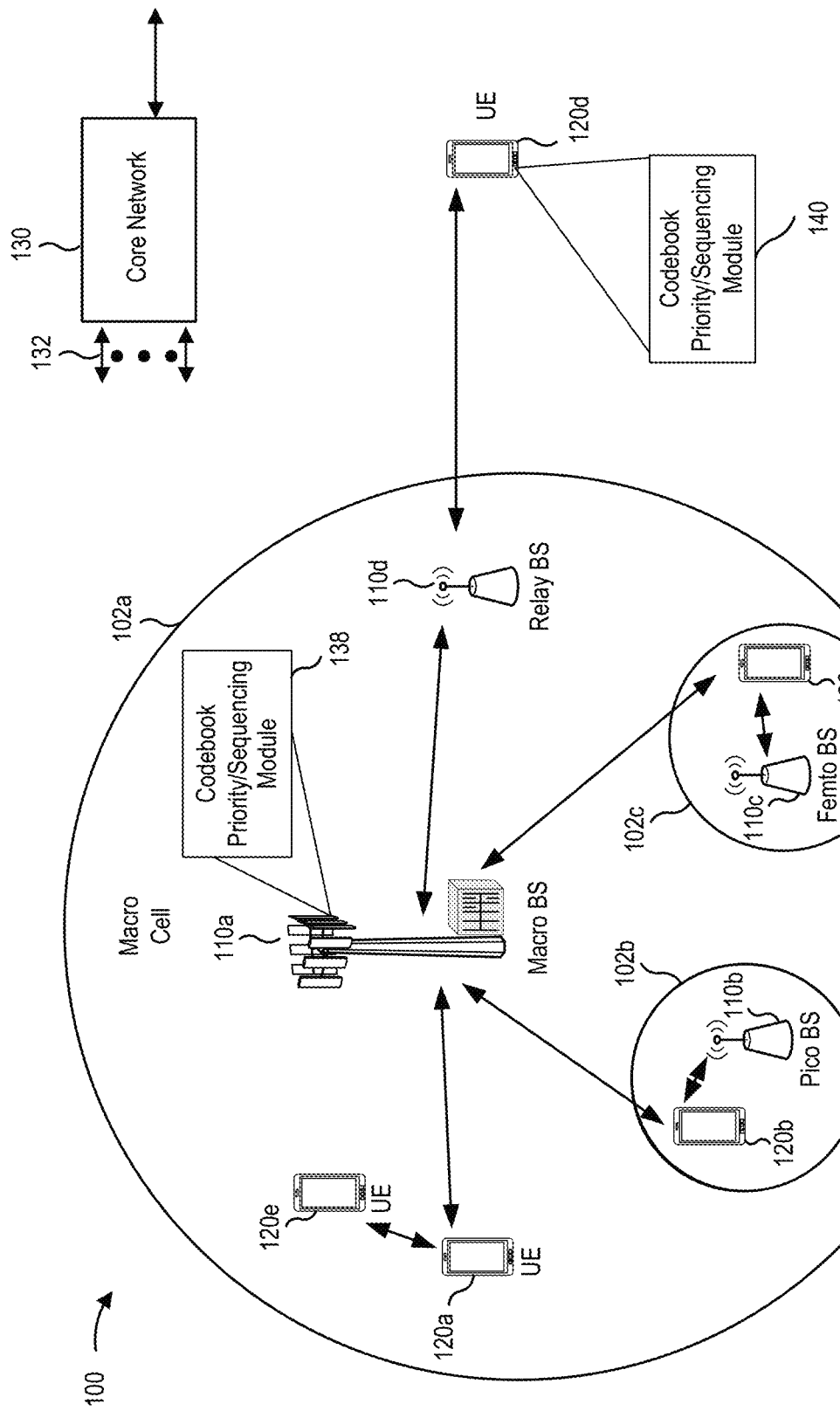
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description, and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Transmissions over wireless communication links may be error prone, for example, due to variations in the wireless channel. Thus, some transmissions may be missed by a receiver or may be too distorted to decode. Techniques for retransmitting missed or improperly decoded transmissions may employ the media access control (MAC) layer hybrid automatic repeat request (HARQ) protocol. According to the HARQ protocol, a user equipment (UE) transmits an acknowledgment (ACK) or negative acknowledgement (NACK) in a target slot occurring a period of time (k1) after a base station transmits a physical downlink shared channel (PDSCH). In case the target slot falls in a downlink slot, the UE defers transmission until a first available uplink slot. The target slot may fall in a downlink slot, for example, due to a time division duplexed (TDD) uplink/downlink format change, such as when more downlink traffic is expected.

A physical uplink control channel (PUCCH) may transport the HARQ feedback. In some configurations, a stream of downlink data is semi-persistently scheduled (SPS), along with the PUCCH. The SPS stream and associated PUCCH may have a physical layer (L1) priority level, for example, high priority or low priority. When multiple HARQ acknowledgements are multiplexed in the PUCCH, the HARQ feedback may be multiplexed using a codebook. When a next available transmission for a deferred HARQ transmission occurs in the same slot as a regularly scheduled HARQ transmission for another SPS stream, a deferred HARQ codebook may be appended at the end of the regularly scheduled HARQ codebook. Regularly scheduled means the HARQ transmission follows an SPS configuration with respect to HARQ timing. It would be desirable to have a technique for handling different physical layer (L1) priorities in the case of SPS HARQ deferral.

New HARQ bits (either new dynamic grant (DG) HARQ codebooks or new SPS HARQ codebooks) may be multiplexed with deferred SPS HARQ codebooks of different L1 priorities. Moreover, multiple deferred SPS HARQ codebooks may be multiplexed onto a same PUCCH. It would be desirable to know a priority of a combined codebook including HARQ codebooks with different L1 priorities, that is, which L1 priority is applied to a combined HARQ codebook with a mix of high priority and low priority HARQ codebooks.

It would also be desirable to know a sequence of several deferred SPS HARQ codebooks multiplexed together, for example, what is an appending order of multiple deferred SPS HARQ codebooks, what are options for multiplexing more than one SPS HARQ codebook, and what is a final priority of multiple SPS HARQ codebooks in the absence of new HARQ codebooks.

According to aspects of the present disclosure, when multiplexing new and deferred SPS HARQ codebooks of different L1 priorities, the combined HARQ codebook is deemed high priority if the combined HARQ codebook includes at least one high priority HARQ bit. According to further aspects of the present disclosure, when multiplexing different SPS HARQ codebooks of any priority, the combined HARQ codebook is deemed high priority if it includes at least one high priority HARQ bit. According to still further aspects, multiple deferred SPS HARQ codebooks are appended in a sequence based on an initial SPS PUCCH when the time slot of the initial SPS PUCCH would have collided with a downlink time slot.

According to aspects of the present disclosure, a combined HARQ codebook includes multiple deferred SPS HARQ codebooks multiplexed onto a same target PUCCH. The multiplexed deferred SPS HARQ codebooks may be of any L1 priority. In some aspects, the deferred SPS HARQ codebooks are appended to new regularly scheduled HARQ codebook(s), if they are present. In these aspects, the deferred SPS HARQ codebooks may be ordered according to the timing of the initial SPS PUCCH that would have collided with the downlink slots. That is, the deferred SPS HARQ codebooks are not ordered according to L1 priority.

According to further aspects of the present disclosure, joint coding is performed on the various HARQ codebooks of different priorities within the combined HARQ codebook. The joint coding may be performed in accordance with the priority of the combined HARQ codebook. For example, high priority coding may be applied if at least one high priority HARQ codebook is present in the combined HARQ codebook.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a codebook priority/sequencing module 140. For brevity, only one UE 120d is shown as including the codebook priority/sequencing module 140. The codebook priority/sequencing module 140 may defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority. The codebook priority/sequencing module 140 may also schedule transmission of a second HARQ codebook at the target PUCCH, the second HARQ codebook having a physical layer (L1) low priority. The codebook priority/sequencing module 140 may further multiplex the first HARQ codebook and the second HARQ codebook to generate a combined HARQ codebook for transmission in the target PUCCH. The codebook priority/sequencing module 140 may also defer transmission of a second HARQ codebook, due to potential collision of a second initial SPS PUCCH with a second downlink symbol, until the target PUCCH, the second HARQ codebook having a physical layer (L1) low priority. The codebook priority/sequencing module 140 may sequence the first HARQ codebook and the second HARQ codebook in the combined HARQ codebook based on a timing of the first initial SPS PUCCH and the second initial SPS PUCCH. The combined HARQ codebook may have the physical layer (L1) high priority due to inclusion of the first HARQ codebook with the physical layer (L1) high priority. The codebook priority/sequencing module 140 may jointly code the first HARQ codebook and the second HARQ codebook of the combined HARQ codebook based on a physical layer (L1) priority level of the combined HARQ codebook The core network 130 or the base stations 110 may include a codebook priority/sequencing module 138. The codebook priority/sequencing module 138 may transmit, to a user equipment (UE), a first semi-persistently scheduled (SPS) physical downlink shared channel (PDSCH). The codebook priority/sequencing module 138 may also transmit, to the UE, a second SPS PDSCH. The codebook priority/sequencing module 138 may further receive, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority. The combined HARQ codebook may have the physical layer (L1) high priority due to inclusion of the first HARQ codebook with the physical layer (L1) high priority. The codebook priority/sequencing module 138 may receive, from the UE, a combined hybrid automatic repeat request (HARQ) codebook including a first deferred transmission of a first HARQ codebook in response to the first SPS PDSCH, the first HARQ codebook having a physical layer (L1) high priority, and a second deferred transmission of a second HARQ codebook in response to the second SPS PDSCH, the second HARQ codebook having a physical layer (L1) low priority. The codebook priority/sequencing module 138 may jointly decode the first HARQ codebook and the second HARQ codebook of the combined HARQ codebook based on a physical layer (L1) priority level of the combined HARQ codebook.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
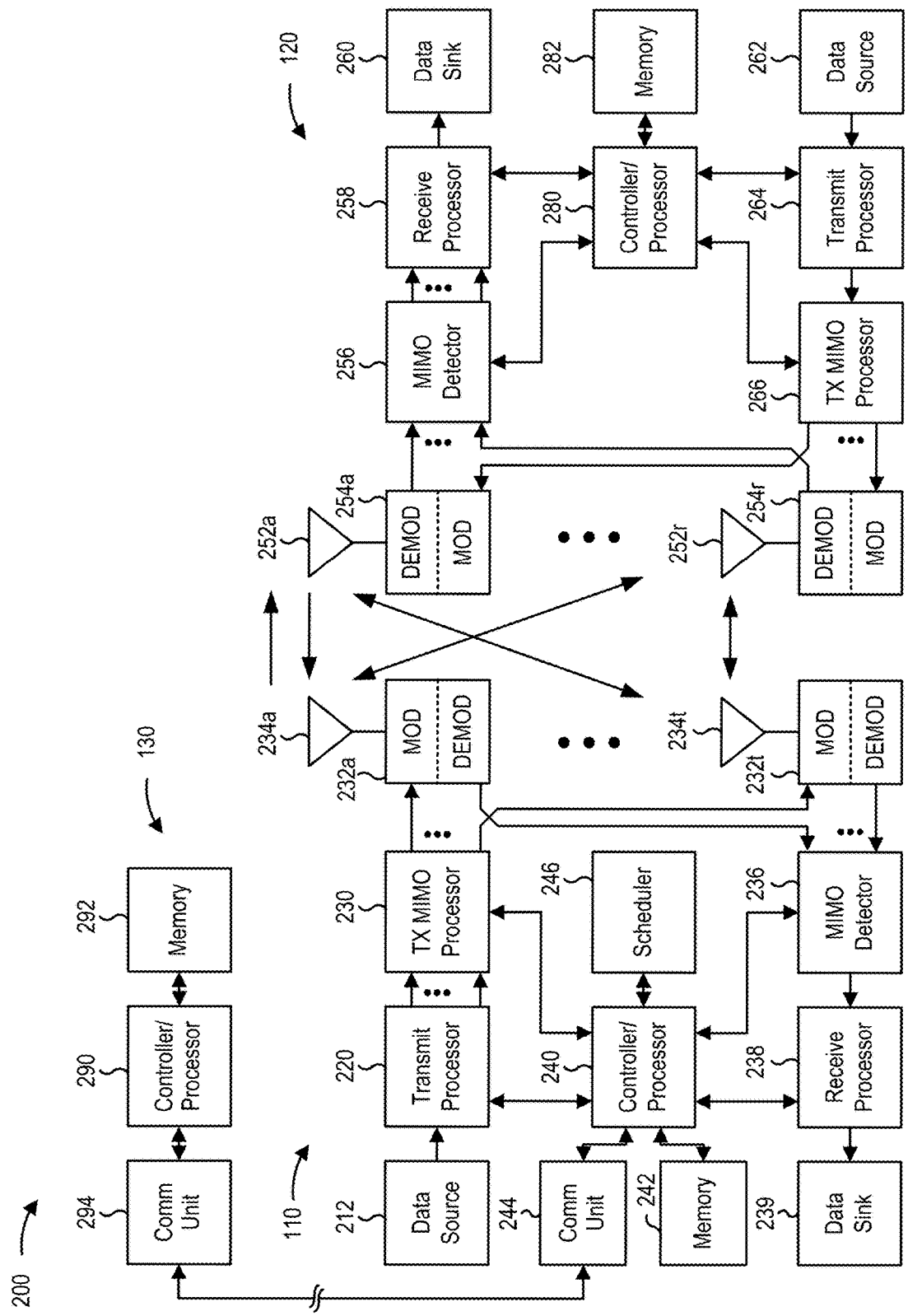
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for discrete Fourier transform spread (DFT-s)-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with sequencing/prioritization, as described in more detail elsewhere. For example, the controller/processor 240 of the base station 110, the controller/processor 280 of the UE 120, and/or any other component(s) of FIG. 2 may perform or direct operations of, for example, the processes of FIGS. 7-10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and base station 110 may include means for deferring, means for scheduling, means for multiplexing, means for jointly coding, means for sequencing, means for appending, means for transmitting, and/or means for receiving. Such means may include one or more components of the UE 120 or base station 110 described in connection with FIG. 2.

As indicated above, FIG. 2 is provided merely as an example. Other examples may differ from what is described with regard to FIG. 2.

Transmissions over wireless communication links may be error prone, for example, due to variations in the wireless channel. Thus, some transmissions may be missed by a receiver or may be too distorted to decode. Techniques for retransmitting missed or improperly decoded transmissions may employ the media access control (MAC) layer hybrid automatic repeat request (HARQ) protocol. According to the HARQ protocol, a UE transmits an acknowledgment (ACK) or negative acknowledgment (NACK) in a target slot occurring a period of time (k1) after a base station transmits a physical downlink shared channel (PDSCH). In case the target slot falls in a downlink slot, the UE defers transmission until a first available uplink slot. The target slot may fall in a downlink slot, for example, due to a time division duplexed (TDD) uplink/downlink format change, such as when more downlink traffic is expected.

A physical uplink control channel (PUCCH) may transport the HARQ feedback. In some configurations, a stream of downlink data is semi-persistently scheduled (SPS), along with the PUCCH. The SPS stream and associated PUCCH may have a physical layer (L1) priority level, for example, high priority or low priority. When multiple HARQ acknowledgements are multiplexed in the PUCCH, the HARQ feedback may be multiplexed using a codebook. When a next available transmission for a deferred HARQ transmission occurs in the same slot as a regularly scheduled HARQ transmission for another SPS stream, a deferred HARQ codebook may be appended at the end of the regularly scheduled HARQ codebook. Regularly scheduled means the HARQ transmission follows an SPS configuration with respect to HARQ timing. It would be desirable to have a technique for handling different physical layer (L1) priorities in the case of SPS HARQ deferral.

New HARQ bits (either new dynamic grant (DG) HARQ codebooks or new SPS HARQ codebooks) may be multiplexed with deferred SPS HARQ codebooks of different L1 priorities. Moreover, multiple deferred SPS HARQ codebooks may be multiplexed onto a same PUCCH. It would be desirable to know a priority of a combined codebook including HARQ codebooks with different L1 priorities, that is, which L1 priority is applied to a combined HARQ codebook with a mix of high priority and low priority HARQ codebooks.

It would also be desirable to know a sequence of several deferred SPS HARQ codebooks multiplexed together, for example, what is an appending order of multiple deferred SPS HARQ codebooks, what are options for multiplexing more than one SPS HARQ codebook, and what is a final priority of multiple SPS HARQ codebooks in the absence of new HARQ codebooks.

According to aspects of the present disclosure, when multiplexing new and deferred SPS HARQ codebooks of different L1 priorities, the combined HARQ codebook is deemed high priority if the combined HARQ codebook includes at least one high priority HARQ bit. According to further aspects of the present disclosure, when multiplexing different SPS HARQ codebooks of any priority, the combined HARQ codebook is deemed high priority if it includes at least one high priority HARQ bit. According to still further aspects, multiple deferred SPS HARQ codebooks are appended in a sequence based on an initial SPS PUCCH when the time slot of the initial SPS PUCCH would have collided with a downlink time slot.

Figure 3:
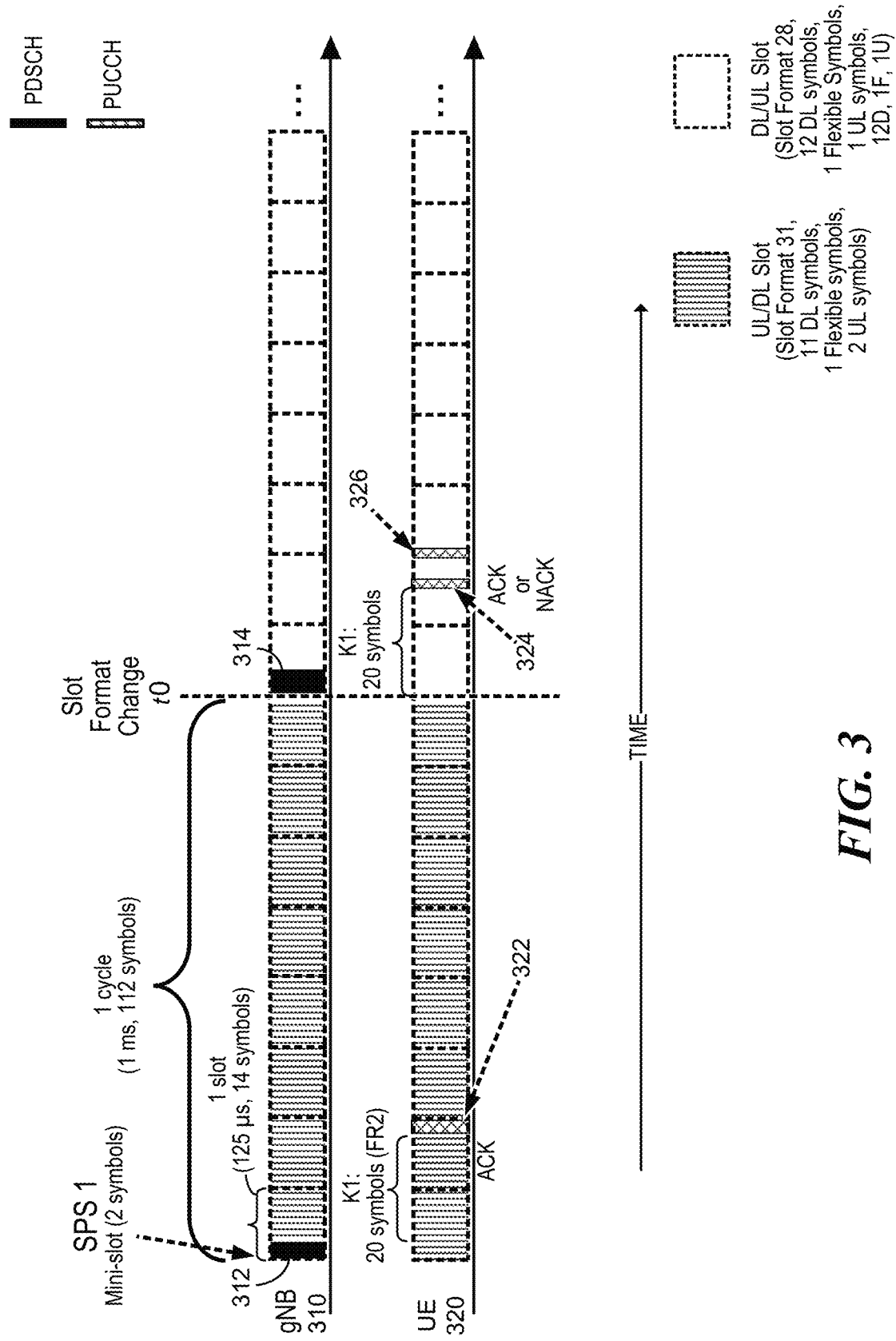
FIG. 3 is a timing diagram showing a base station timeline and a UE timeline for deferring a semi-persistently scheduled (SPS) hybrid automatic repeat request (HARQ) codebook, in accordance with aspects of the present disclosure.

FIG. 3 is a timing diagram showing a base station (e.g., gNB) timeline 310 and a UE timeline 320 for deferring a HARQ codebook, in accordance with aspects of the present disclosure. In the example of FIG. 3, a first PDSCH 312 and a second PDSCH 314 are transmitted in a first SPS stream (SPS 1). In the example shown in FIG. 3, it is assumed that the configuration of the first SPS stream (SPS 1) is two symbols for PDSCH, the k1 parameter is 20 symbols, the industrial internet of things (IIoT) cycle is one ms, and for the SPS 1 PUCCH ACK/NACK (A/N) PUCCH format zero (PF0), one HARQ bit occupies one symbol. Because the value of the k1 parameter is 20 symbols, an ACK/NACK feedback occurs 20 symbols after scheduled transmission of a PDSCH. Thus, a first SPS PUCCH HARQ feedback 322 occurs 20 symbols after the first PDSCH 312.

In the example of FIG. 3, a slot format changes at time t0 from a slot having eleven downlink symbols, one flexible symbol and two uplink symbols, to a slot having twelve downlink symbols, one flexible symbol, and one uplink symbol. The format change may have occurred because more downlink traffic is expected. As a result of the format change, the feedback to be transmitted 20 symbols after the second PDSCH 314 would arrive at a downlink symbol, instead of arriving at an uplink symbol. Thus, after the format change, a second SPS PUCCH HARQ feedback 324 is deferred to a first available PUCCH symbol 326 to avoid a collision with a downlink symbol. In this case, the second SPS PUCCH HARQ feedback 324 may be appended to regularly scheduled SPS HARQ PUCCH feedback at the PUCCH symbol 326.

For SPS HARQ-acknowledgment (ACK) deferral, deferred SPS HARQ bits from more than one initial PUCCH slot may be jointly deferred to a target PUCCH slot. For SPS HARQ-ACK deferral, in the target PUCCH slot, the deferred SPS HARQ-ACK bits may be appended to regularly scheduled HARQ bits with a Type 1 or Type 2 codebook.

Figure 4:
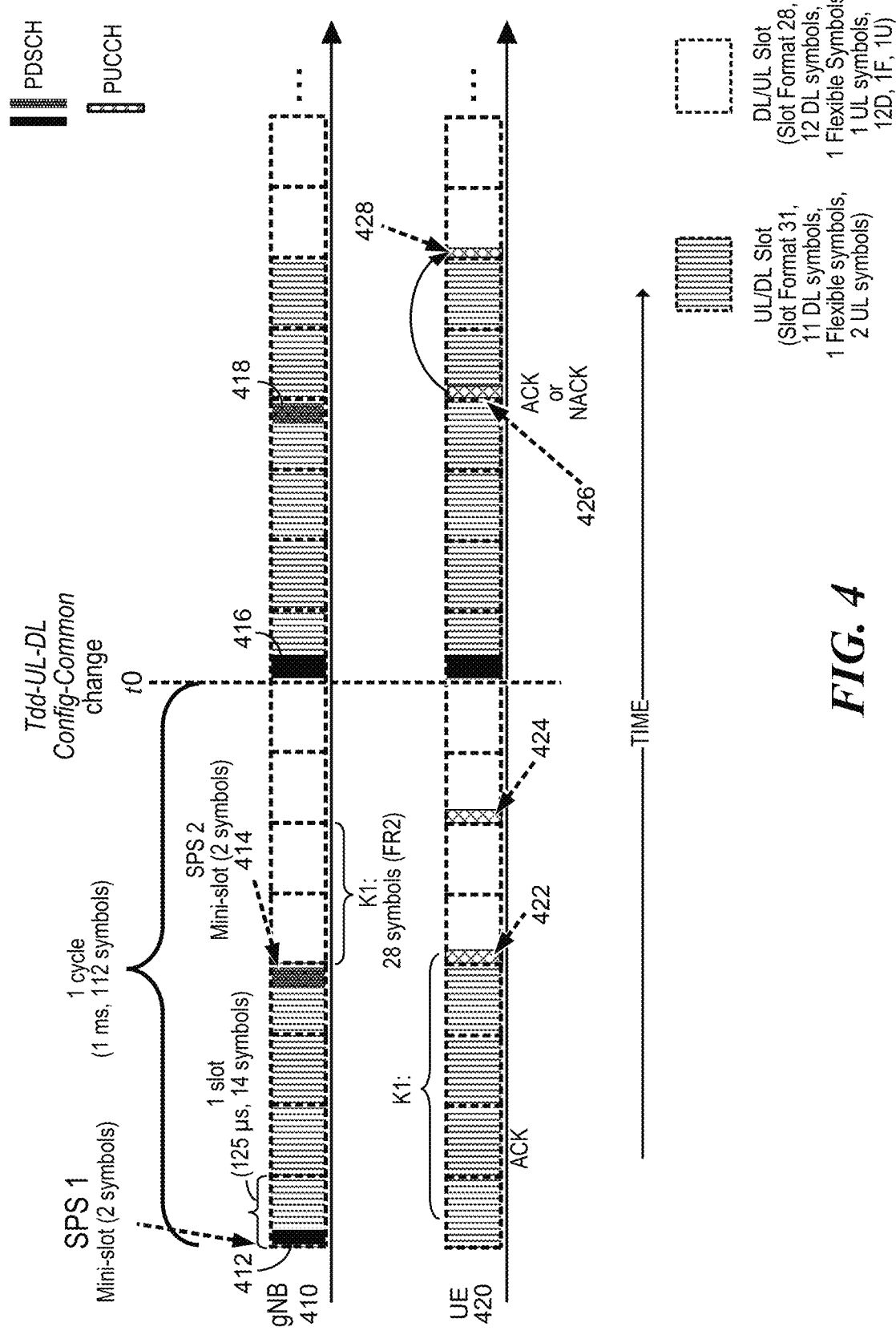
FIG. 4 is a timing diagram showing a base station timeline and a UE timeline for prioritizing SPS HARQ codebooks, in accordance with aspects of the present disclosure.

According to aspects of the present disclosure, priority handling is defined for deferred SPS HARQ feedback multiplexing with other HARQ bits. FIG. 4 is a timing diagram showing a base station (e.g., gNB) timeline 410 and a UE timeline 420 for prioritizing HARQ codebooks, in accordance with aspects of the present disclosure. In the example of FIG. 4, a first PDSCH 412 and a third PDSCH 416 are transmitted in a first SPS stream (SPS 1), and a second PDSCH 414 and a fourth PDSCH 418 are transmitted in a second SPS stream (SPS 2). In the example of FIG. 4, it is assumed that a first stream (SPS 1) is configured with two symbols for PDSCH, with a k1 value of 44 symbols, and IIoT cycle of one ms, and the SPS 1 PUCCH A/N PFO has one HARQ bit occupying one symbol. The L1 priority of SPS 1 is high priority for SPS HARQ deferral. The configuration for SPS 2 is two symbols for PDSCH, with a k1 value of 28 symbols, and IIoT cycle of one ms. The SPS 1 PUCCH A/N PFO of one HARQ bit occupies one symbol. The L1 priority for SPS 2 is low priority for SPS HARQ deferral. The initial time division duplex (TDD) uplink-downlink (UL-DL) configuration is four downlink slots and four uplink slots, with a periodicity of one ms. The TDD UL-DL configuration after the format change is six downlink slots and two uplink slots with a periodicity of one ms. For example, the initial TDD UL-DL configuration may be configured via RRC information element TDD-UL-DL-CofigCommon, which determines a cell specific uplink/downlink TDD configuration. The TDD UL-DL configuration after a configuration change is six downlink slots and two uplink slots with a periodicity of one ms. Here, each downlink slot may include 14 downlink symbols, and each uplink slot may include 14 uplink symbols. The TDD configuration change may have occurred because more downlink traffic is expected.

Before the TDD UL-DL configuration change at time t0, a first SPS PUCCH HARQ feedback 422 occurs 44 symbols after the first PDSCH 412. A second SPS PUCCH HARQ feedback 424 occurs 28 symbols after the second PDSCH 414. After the TDD UL-DL configuration change, a third SPS PUCCH HARQ feedback 426 occurs 44 symbols after the third PDSCH 416. It can be seen that the third SPS PUCCH HARQ feedback 426 would collide with a downlink slot. The third SPS PUCCH HARQ feedback 426 is thus deferred to the first available PUCCH at the uplink time slot 428. The third SPS PUCCH HARQ feedback 426 is multiplexed with a regularly scheduled HARQ feedback for the second SPS stream (SPS 2) at the uplink time slot 428.

According to aspects of the present disclosure, the final priority of the combined HARQ codebook transmitted at time slot 428 (e.g., uplink slot) is high priority due to the presence of a high priority HARQ bit in the combined HARQ codebook. The priority is not based on the L1 priority of the regularly scheduled low priority HARQ bits that were supposed to be transmitted at the current slot. More specifically, if any bit of the combined HARQ codebook is high priority, then the combined HARQ codebook is deemed to be high priority. In the example of FIG. 4, the low priority SPS 2 HARQ codebook combined with the deferred high priority SPS 1 HARQ codebook generates a high priority combined HARQ codebook for transmission to the base station at the uplink time slot 428. As result of this prioritization, lower latency and higher accuracy are achieved. The high priority combined HARQ codebook transmission (via the PUCCH) may have a higher priority than another uplink transmission when a potential collision occurs. In an example, a dropping rule may favor the high priority PUCCH transmission instead of the other uplink transmission in order to resolve the conflict.

Figure 5:
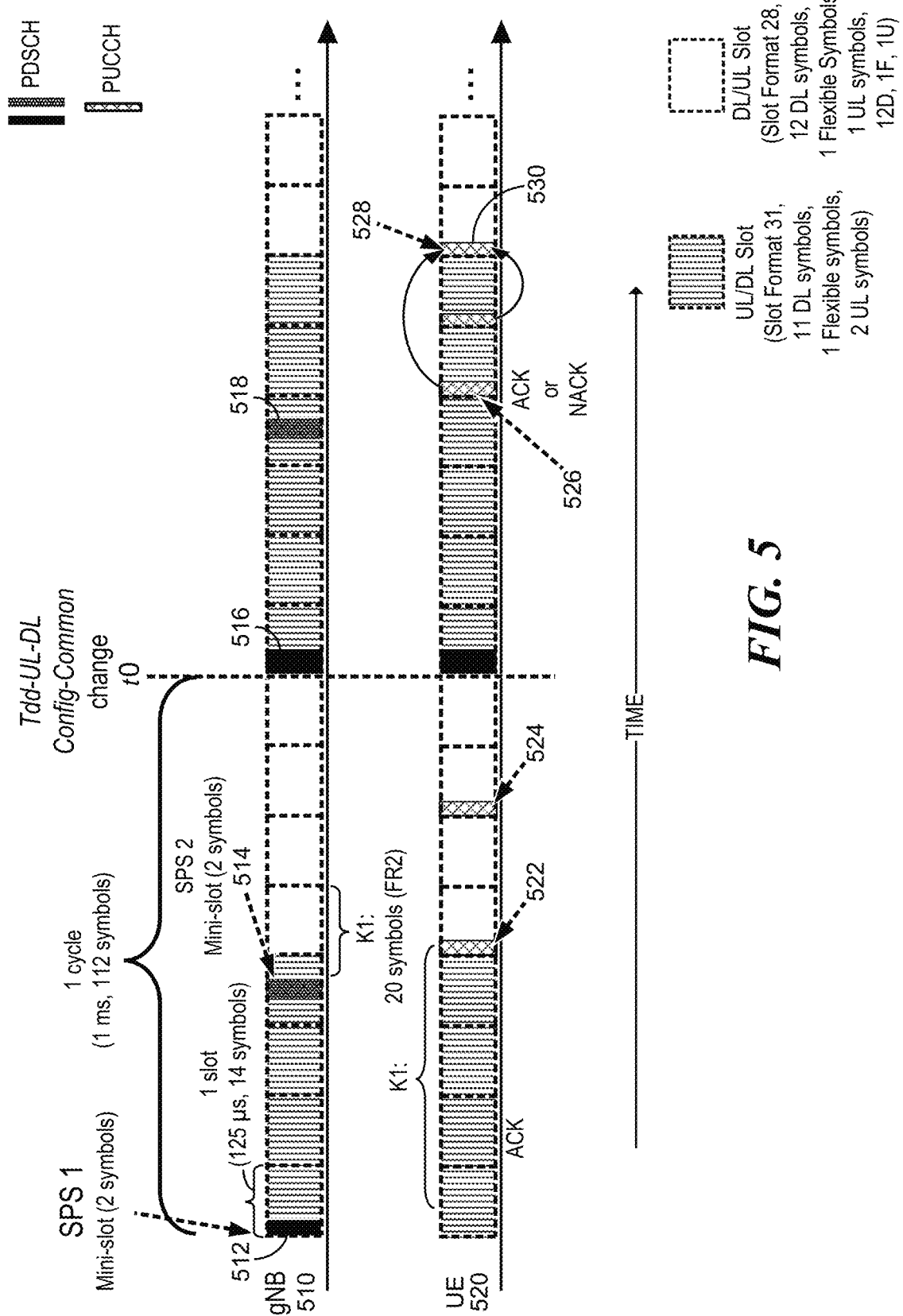
FIG. 5 is a timing diagram showing a base station timeline and a UE timeline for prioritizing deferred SPS HARQ codebooks, in accordance with aspects of the present disclosure.

FIG. 5 is a timing diagram showing a base station (e.g., gNB) timeline and a UE timeline for prioritizing deferred HARQ codebooks, in accordance with aspects of the present disclosure. In the example of FIG. 5, it is assumed that a first stream (SPS 1) is configured with two symbols for PDSCH, with a k1 value of 44 symbols, and IIoT cycle of one ms. The SPS 1 PUCCH A/N PFO includes one HARQ bit occupying one symbol. The L1 priority of SPS 1 is high priority for SPS HARQ deferral. The configuration for a second stream (SPS 2) is two symbols for PDSCH, with a k1 value of 28 symbols, and IIoT cycle of one ms. The SPS 1 PUCCH A/N PFO includes one HARQ bit occupying one symbol. The L1 priority for SPS 2 is low priority for SPS HARQ deferral. The initial TDD UL-DL configuration is four downlink slots and four uplink slots, with a periodicity of one ms. The TDD UL-DL configuration after the format change is six downlink slots and two uplink slots with a periodicity of one ms. For example, the initial TDD UL-DL configuration may be configured via RRC information element TDD-UL-DL-CofigCommon, which determines a cell specific uplink/downlink TDD configuration. The TDD UL-DL configuration after a configuration change is six downlink slots and two uplink slots with a periodicity of one ms. Here, each downlink slot may include 14 downlink symbols, and each uplink slot may include 14 uplink symbols. The TDD configuration change may have occurred because more downlink traffic is expected.

In the example of FIG. 5, a first PDSCH 512 and a third PDSCH 516 are transmitted in a first SPS stream (SPS 1), and a second PDSCH 514 and a fourth PDSCH 518 are transmitted in a second SPS stream (SPS 2). Before the TDD UL-DL configuration change at time t0, a first SPS PUCCH HARQ feedback 522 occurs 44 symbols after the first PDSCH 502. A second SPS PUCCH HARQ feedback 524 occurs 28 symbols after the second PDSCH 514.

After the TDD UL-DL configuration change, a third SPS PUCCH HARQ feedback 526 occurs 44 symbols after the third PDSCH 516. It can be seen that the third SPS PUCCH HARQ feedback 526 would collide with a downlink slot due to the format change. The third SPS PUCCH HARQ feedback 526 is thus deferred to a first available uplink time slot 530. A fourth SPS PUCCH HARQ feedback 528 occurs 28 symbols after the fourth PDSCH 518. It can be seen that the fourth SPS PUCCH HARQ feedback 528 would also collide with a downlink slot. The fourth SPS PUCCH HARQ feedback 528 is thus deferred to the first available uplink time slot 530. The third SPS PUCCH HARQ feedback 526 is multiplexed with the fourth SPS PUCCH HARQ feedback 528 for the second SPS stream (SPS 2) at the uplink time slot 530.

In the example of FIG. 5, the SPS 1 HARQ bits are deferred to a same uplink time slot 530 as the SPS 2 HARQ bits. Aspects of the present disclosure address priority handling for multiplexing of the deferred SPS HARQ bits. In these aspects, the final priority of the combined HARQ codebook is dependent on the presence of a high priority HARQ bit and not the L1 priority of the first appended HARQ codebook. Moreover, high priority and low priority HARQ codebooks may be multiplexed into a same queue without following the L1 priority order. This type of multiplexing is in contrast to existing systems where high priority and low priority HARQ codebooks are not multiplexed, resulting in one high priority HARQ codebook and another low priority HARQ codebook. In some aspects, when high priority and low priority HARQ codebooks are multiplexed, the sequence of codebooks within the combined codebook may start with high priority HARQ codebooks and then follow with low priority HARQ codebooks. In other aspects, the sequence may start with low priority HARQ codebooks and then follow with high priority HARQ codebooks.

In the example of FIG. 5, the combined HARQ codebook includes a deferred high priority SPS 1 HARQ codebook and a deferred low priority SPS 2 HARQ codebook. The L1 priority of the combined HARQ codebook is high priority because at least one high priority HARQ bit is present in the combined HARQ codebook. Benefits of this solution include lower latency.

According to aspects of the present disclosure, a combined HARQ codebook includes multiple deferred SPS HARQ codebooks multiplexed onto a same target PUCCH. The multiple multiplexed deferred SPS HARQ codebooks may be of any L1 priority. In some aspects, the deferred SPS HARQ codebooks are appended to new regularly scheduled HARQ codebook(s), if they are present. In these aspects, the deferred SPS HARQ codebooks may be ordered according to the timing of the initial SPS PUCCH that would have collided with the downlink slots. That is, the deferred SPS HARQ codebooks are not ordered according to L1 priority.

Figure 6:
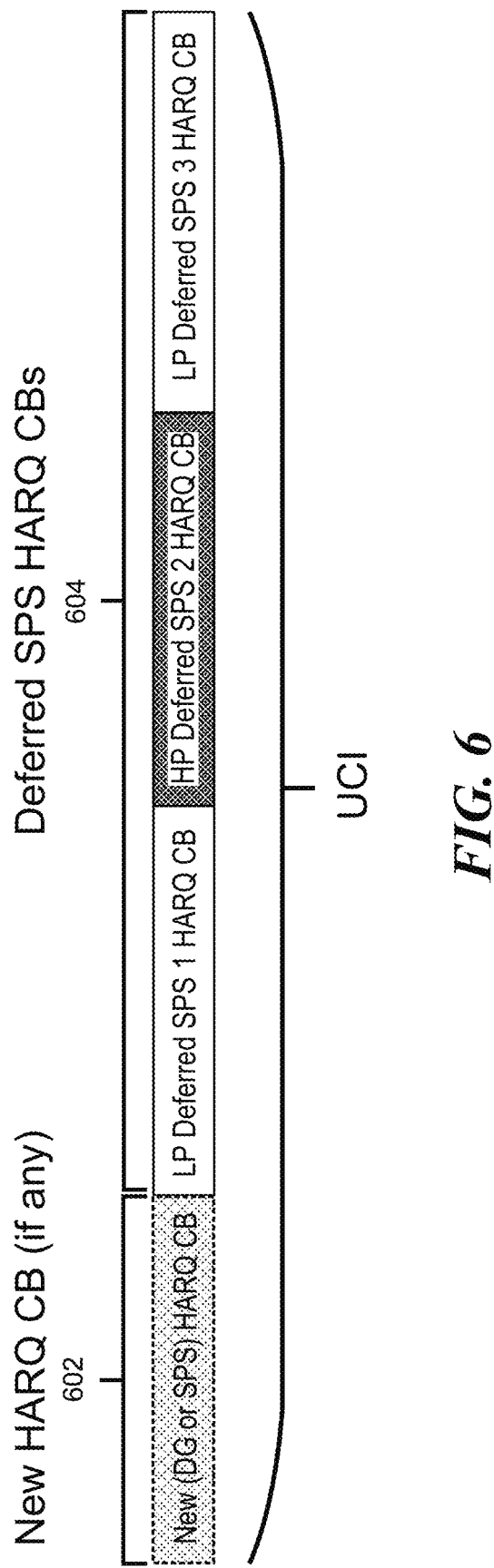
FIG. 6 is a block diagram illustrating sequencing of SPS HARQ codebooks, in accordance with aspects of the present disclosure.

FIG. 6 is a block diagram illustrating sequencing of SPS HARQ codebooks, in accordance with aspects of the present disclosure. In the example of FIG. 6, the uplink control information (UCI) includes a new HARQ codebook (CB) 602 based on either a dynamic grant (DG) or SPS. Deferred SPS HARQ codebooks 604 are appended after the new HARQ codebook(s) 602. The deferred SPS HARQ codebooks 604 are sequenced based on the initial SPS PUCCHs. That is, a first deferred SPS HARQ codebook is associated with SPS 1 even though it is low priority (LP). A second deferred SPS HARQ codebook is associated with SPS 2, which is high priority (HP). A third deferred SPS HARQ codebook is associated with a third stream (SPS 3), which is also low priority.

According to further aspects of the present disclosure, joint coding is performed on the various HARQ codebooks of different priorities within the combined HARQ codebook. The joint coding may be performed in accordance with the priority of the combined HARQ codebook. For example, high priority coding may be applied if at least one high priority HARQ codebook is present in the combined HARQ codebook.

As indicated above, FIGS. 3-6 are provided as examples. Other examples may differ from what is described with respect to FIGS. 3-6.

Figure 7:
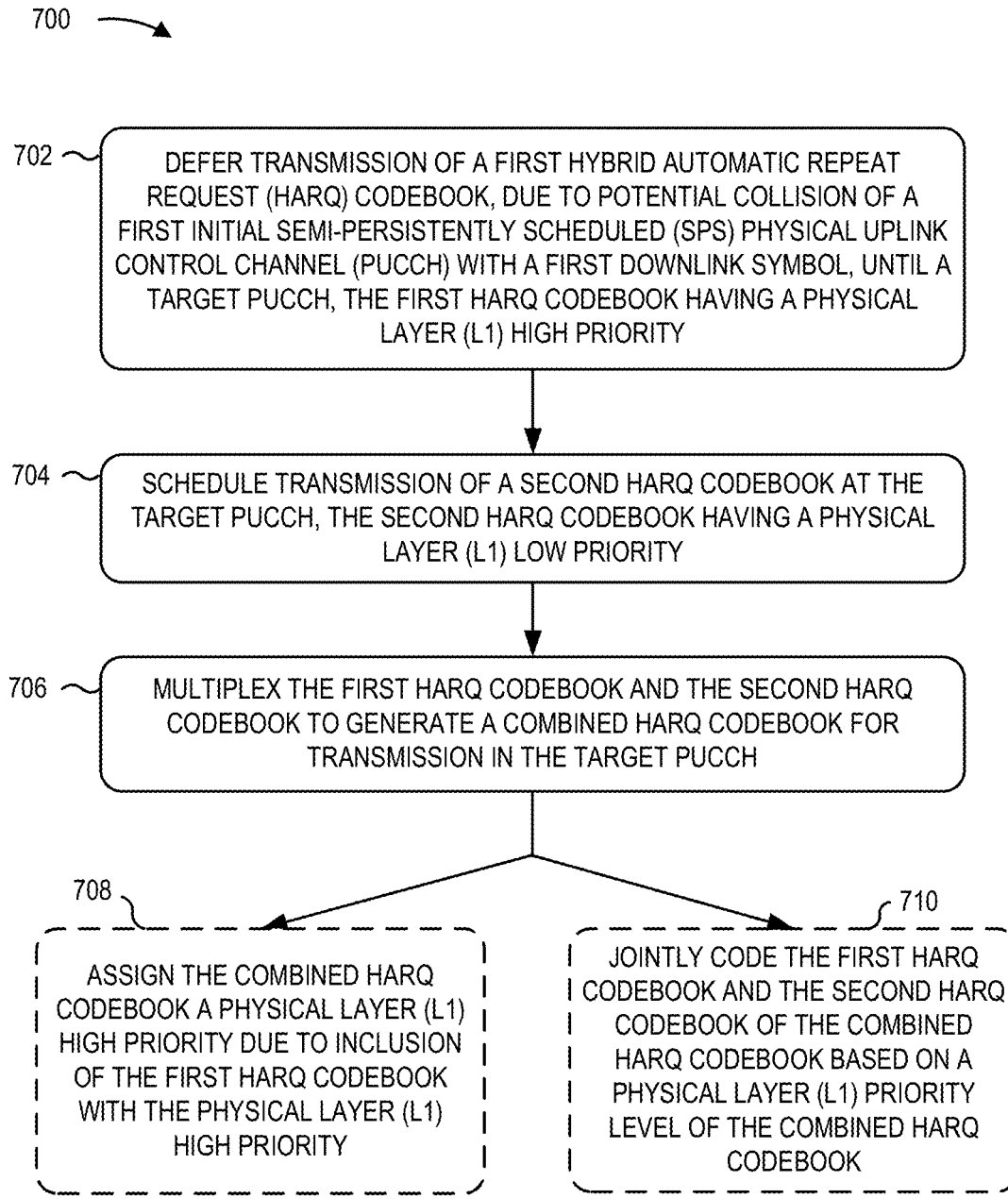
FIG. 7 is a flow diagram illustrating an example process performed, for example, by a user equipment (UE), in accordance with various aspects of the present disclosure.

FIG. 7 is a flow diagram illustrating an example process 700 performed, for example, by a UE in accordance with various aspects of the present disclosure. The example process 700 is an example of deferred semi-persistent scheduling (SPS) hybrid automatic repeat request (HARQ) codebook sequencing and prioritizing. The operations of the process 700 may be implemented by a UE 120.

In block 702, the UE may defer transmission of a first hybrid automatic repeat request (HARQ) codebook, due to potential collision of a first initial semi-persistently scheduled (SPS) physical uplink control channel (PUCCH) with a first downlink symbol, until a target PUCCH. The first HARQ codebook has a physical layer (L1) high priority. For example, the UE (e.g. using the controller/processor 280, and/or memory 282) may defer the transmission of the first HARQ codebook.

In block 704, the UE may schedule transmission of a second HARQ codebook at the target PUCCH. The second HARQ codebook has a physical layer (L1) low priority. For example, the UE (e.g. using the controller/processor 280, and/or memory 282) may schedule the transmission of the second HARQ codebook at the target PUCCH.

In block 706, the UE may multiplex the first HARQ codebook and the second HARQ codebook to generate a combined HARQ codebook for transmission in the target PUCCH. For example, the UE (e.g. using the controller/processor 280, and/or memory 282) may multiplex the first and second HARQ codebooks to generate the combined HARQ codebook.

Following block 706, in an optional block 708, the combined HARQ codebook may be assigned the physical layer (L1) high priority due to inclusion of the first HARQ codebook with the physical layer (L1) high priority. Alternatively, in a second optional block 710, the UE may jointly code the first HARQ codebook and the second HARQ codebook of the combined HARQ codebook based on a physical layer (L1) priority level of the combined HARQ codebook. For example, the UE (e.g. using the controller/processor 280, and/or memory 282) may jointly code the first and second HARQ codebooks of the combined HARQ codebook and/or assign the priority.

Figure 8:
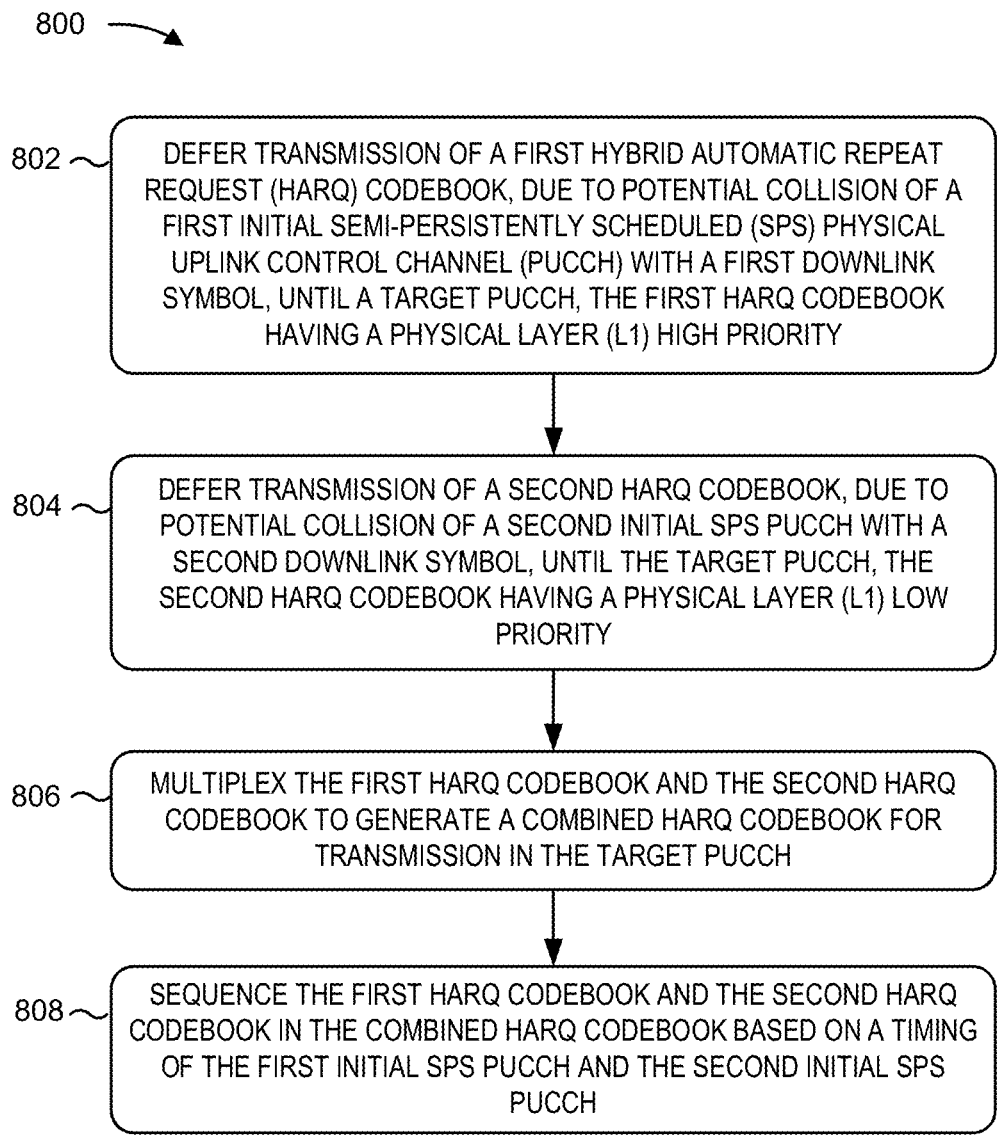
FIG. 8 is a flow diagram illustrating an example process performed, for example, by a user equipment (UE), in accordance with various aspects of the present disclosure.

FIG. 8 is a flow diagram illustrating an example process 800 performed, for example, by a UE in accordance with various aspects of the present disclosure. The example process 800 is an example of deferred semi-persistent scheduling (SPS) hybrid automatic repeat request (HARQ) codebook sequencing and prioritizing. The operations of the process 800 may be implemented by a UE 120.

In block 802, the UE may defer transmission of a first hybrid automatic repeat request (HARQ) codebook, due to potential collision of a first initial semi-persistently scheduled (SPS) physical uplink control channel (PUCCH) with a first downlink symbol, until a target PUCCH. The first HARQ codebook has a physical layer (L1) high priority. For example, the UE (e.g. using the controller/processor 280, and/or memory 282) may defer the transmission of the first HARQ codebook.

In block 804, the UE may defer transmission of a second HARQ codebook, due to potential collision of a second initial SPS PUCCH with a second downlink symbol, until the target PUCCH. The second HARQ codebook has a physical layer (L1) low priority. For example, the UE (e.g. using the controller/processor 280, and/or memory 282) may defer the transmission of the second HARQ codebook.

In block 806, the UE may multiplex the first HARQ codebook and the second HARQ codebook to generate a combined HARQ codebook for transmission in the target PUCCH. For example, the UE (e.g. using the controller/processor 280, and/or memory 282) may multiplex the first and second HARQ codebooks to generate the combined HARQ codebook for transmission in the target PUCCH.

Finally, in block 808, the UE may sequence the first HARQ codebook and the second HARQ codebook in the combined HARQ codebook based on a timing of the first initial SPS PUCCH and the second initial SPS PUCCH. For example, the UE (e.g. using the controller/processor 280, and/or memory 282) may sequence the first and second HARQ codebooks in the combined HARQ codebook.

Figure 9:
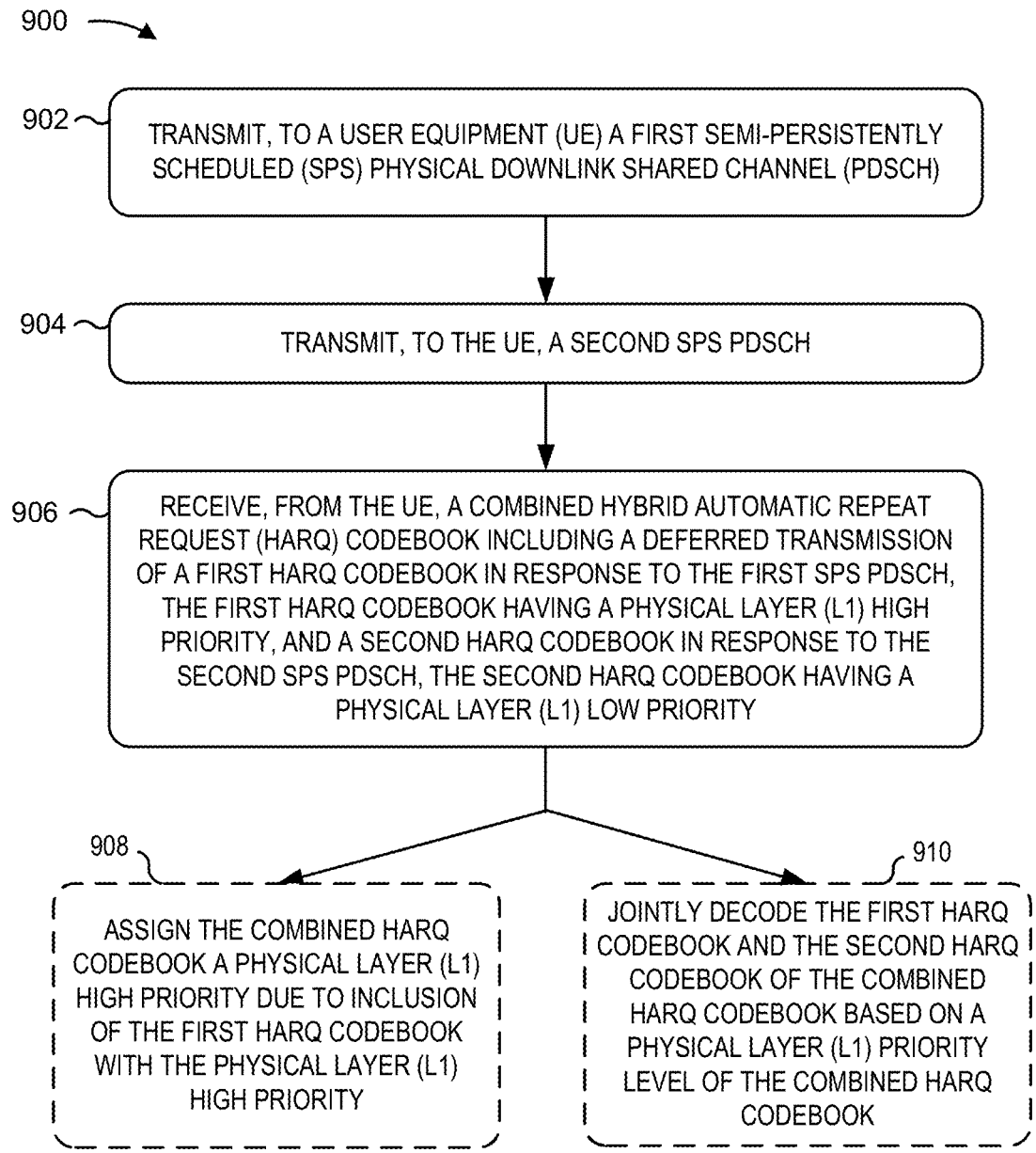
FIG. 9 is a flow diagram illustrating an example process performed, for example, by a base station, in accordance with various aspects of the present disclosure.

FIG. 9 is a flow diagram illustrating an example process 900 performed, for example, by a base station, in accordance with various aspects of the present disclosure. The example process 900 is an example of deferred semi-persistent scheduling (SPS) hybrid automatic repeat request (HARQ) codebook sequencing and prioritizing. The operations of the process 900 may be implemented by a base station 110.

In block 902, the base station may transmit, to a user equipment (UE), a first semi-persistently scheduled (SPS) physical downlink shared channel (PDSCH). For example, the base station (e.g. using the antenna 234, MOD/DEMOD 232, TX MIMO processor 230, transmit processor 220, controller/processor 240, and/or memory 242) may transmit the first SPS PDSCH.

In block 904, the base station may transmit, to the UE, a second SPS PDSCH. For example, the base station (e.g. using the antenna 234, MOD/DEMOD 232, TX MIMO processor 230, transmit processor 220, controller/processor 240, and/or memory 242) may transmit the second SPS PDSCH.

In block 906, the base station may receive, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority. For example, the base station (e.g. using the antenna 234, MOD/DEMOD 232, MIMO detector 236, receive processor 228, controller/processor 240, and/or memory 242) may receive the combined HARQ codebook.

Following block 906, in an optional block 908, the combined HARQ codebook may be assigned the physical layer (L1) high priority due to inclusion of the first HARQ codebook with the physical layer (L1) high priority. Alternatively, in an optional block 910, the base station may jointly decode the first HARQ codebook and the second HARQ codebook of the combined HARQ codebook based on a physical layer (L1) priority level of the combined HARQ codebook. For example, the base station (e.g. using the controller/processor 240, and/or memory 242) may jointly decode the first and second HARQ codebooks of the combined HARQ codebooks or perform the assigning.

Figure 10:
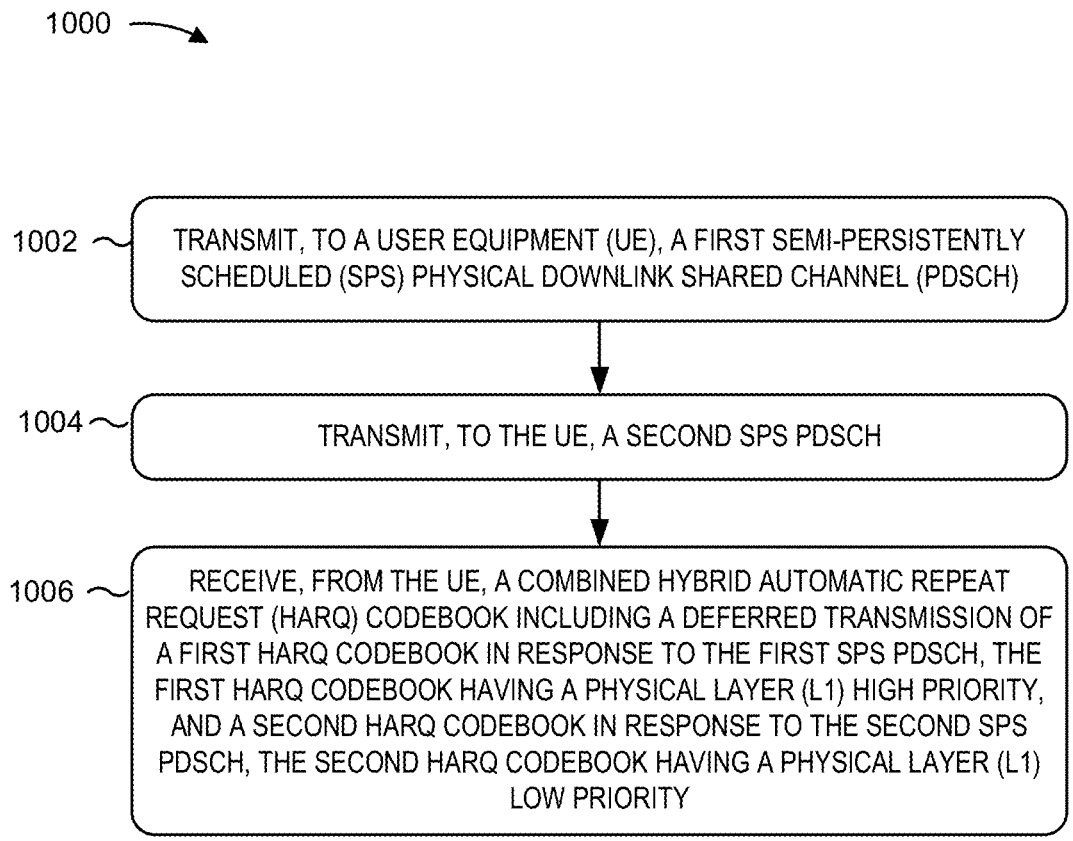
FIG. 10 is a flow diagram illustrating an example process performed, for example, by a base station, in accordance with various aspects of the present disclosure.

FIG. 10 is a flow diagram illustrating an example process 1000 performed, for example, by a base station, in accordance with various aspects of the present disclosure. The example process 1000 is an example of deferred semi-persistent scheduling (SPS) hybrid automatic repeat request (HARQ) codebook sequencing and prioritizing. The operations of the process 1000 may be implemented by a base station 110.

In block 1002, the base station may transmit, to a user equipment (UE), a first semi-persistently scheduled (SPS) physical downlink shared channel (PDSCH). For example, the base station (e.g. using the antenna 234, MOD/DEMOD 232, TX MIMO processor 230, transmit processor 220, controller/processor 240, and/or memory 242) may transmit the first SPS PDSCH.

In block 1004, the base station may transmit, to the UE, a second SPS PDSCH. For example, the base station (e.g. using the antenna 234, MOD/DEMOD 232, TX MIMO processor 230, transmit processor 220, controller/processor 240, and/or memory 242) may transmit the second SPS PDSCH.

Finally, in block 1006, the base station may receive, from the UE, a combined hybrid automatic repeat request (HARQ) codebook including a first deferred transmission of a first HARQ codebook in response to the first SPS PDSCH, the first HARQ codebook having a physical layer (L1) high priority, and a second deferred transmission of a second HARQ codebook in response to the second SPS PDSCH, the second HARQ codebook having a physical layer (L1) low priority. For example, the base station (e.g. using the antenna 234, MOD/DEMOD 232, MIMO detector 236, receive processor 228, controller/processor 240, and/or memory 242) may receive the combined HARQ codebook.

Example Aspects

Aspect 1: A method of wireless communication by a user equipment (UE), comprising: deferring transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; scheduling transmission of a second HARQ codebook at the target PUCCH, the second HARQ codebook having a physical layer (L1) low priority; and multiplexing the first HARQ codebook and the second HARQ codebook to generate a combined HARQ codebook for transmission in the target PUCCH.

Aspect 2: The method of Aspect 1, in which the second HARQ codebook is deferred to the target PUCCH due to potential collision of a second initial SPS PUCCH with a second downlink symbol.

Aspect 3: The method of Aspect 1 or 2, in which the combined HARQ codebook includes the first HARQ codebook and the second HARQ codebook in a sequence based on a timing of the first initial SPS PUCCH and the second initial SPS PUCCH.

Aspect 4: The method of Aspect 1, in which the second HARQ codebook follows an SPS configuration with respect to HARQ timing.

Aspect 5: The method of any of Aspect 1 or 4, in which the combined HARQ codebook includes the first HARQ codebook, appended after the second HARQ codebook.

Aspect 6: The method of any of the preceding Aspects, in which the combined HARQ codebook includes the first HARQ codebook with the physical layer (L1) high priority, followed by the second HARQ codebook with the physical (L1) low priority.

Aspect 7: The method of any of the preceding Aspects 1-5, in which the combined HARQ codebook includes the second HARQ codebook with the physical layer (L1) low priority, followed by the first HARQ codebook with the physical layer (L1) high priority.

Aspect 8: The method of any of the preceding Aspects, further comprising jointly coding the first HARQ codebook and the second HARQ codebook of the combined HARQ codebook based on the physical layer (L1) high priority of the combined HARQ codebook.

Aspect 9: The method of any of the preceding Aspects, further comprising: deferring transmission of a third HARQ codebook, due to potential collision of a third initial SPS PUCCH with a third downlink symbol, until a second target PUCCH, the third HARQ codebook having the physical layer (L1) low priority; scheduling transmission of a fourth HARQ codebook at the second target PUCCH, the fourth HARQ codebook having the physical layer (L1) low priority; and multiplexing the third HARQ codebook and the fourth HARQ codebook to generate a second combined HARQ codebook for transmission in the second target PUCCH, wherein the second combined HARQ codebook has the physical layer (L1) low priority due to inclusion of no HARQ codebooks with the physical layer (L1) high priority.

Aspect 10: A method of wireless communication by a user equipment (UE), comprising: deferring transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; deferring transmission of a second HARQ codebook, due to potential collision of a second initial SPS PUCCH with a second downlink symbol, until the target PUCCH, the second HARQ codebook having a physical layer (L1) low priority; multiplexing the first HARQ codebook and the second HARQ codebook to generate a combined HARQ codebook for transmission in the target PUCCH; and sequencing the first HARQ codebook and the second HARQ codebook in the combined HARQ codebook based on a timing of the first initial SPS PUCCH and the second initial SPS PUCCH.

Aspect 11: The method of Aspect 10, further comprising appending the first HARQ codebook and the second HARQ codebook to a third HARQ codebook that follows an SPS configuration with respect to HARQ timing.

Aspect 12: A method of wireless communication by a user equipment (UE), comprising: deferring transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; scheduling transmission of a second HARQ codebook at the target PUCCH, the second HARQ codebook having a physical layer (L1) low priority; multiplexing the first HARQ codebook and the second HARQ codebook to generate a combined HARQ codebook for transmission in the target PUCCH; and jointly coding the first HARQ codebook and the second HARQ codebook of the combined HARQ codebook based on a physical layer (L1) priority level of the combined HARQ codebook.

Aspect 13: A method of wireless communication by a base station, comprising: transmitting, to a user equipment (UE), a first semi-persistently scheduled (SPS) physical downlink shared channel (PDSCH); transmitting, to the UE, a second SPS PDSCH; and receiving, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority.

Aspect 14: The method of Aspect 13, in which the first HARQ codebook is deferred due to potential collision of a first initial SPS physical uplink control channel (PUCCH) with a first downlink symbol, and the second HARQ codebook is deferred due to potential collision of a second initial SPS PUCCH with a second downlink symbol.

Aspect 15: The method of Aspect 13 or 14, in which the combined HARQ codebook includes the first HARQ codebook and the second HARQ codebook in a sequence based on a timing of the first initial SPS PUCCH and the second initial SPS PUCCH.

Aspect 16: The method of Aspect 13, in which the second HARQ codebook follows an SPS configuration with respect to HARQ timing.

Aspect 17: The method of any of the Aspects 13 or 16, in which the combined HARQ codebook includes the first HARQ codebook, appended after the second HARQ codebook.

Aspect 18: The method of any of the Aspects 13-17, in which the combined HARQ codebook includes the first HARQ codebook with the physical layer (L1) high priority, followed by the second HARQ codebook with the physical (L1) low priority.

Aspect 19: The method of any of the Aspects 13-17, in which the combined HARQ codebook includes the second HARQ codebook with the physical layer (L1) low priority, followed by the first HARQ codebook with the physical layer (L1) high priority.

Aspect 20: The method of any of the Aspects 13-19, further comprising jointly decoding the first HARQ codebook and the second HARQ codebook of the combined HARQ codebook based on the physical layer (L1) high priority of the combined HARQ codebook.

Aspect 21: A method of wireless communication by a base station, comprising: transmitting, to a user equipment (UE), a first semi-persistently scheduled (SPS) physical downlink shared channel (PDSCH); transmitting, to the UE, a second SPS PDSCH; and receiving, from the UE, a combined hybrid automatic repeat request (HARQ) codebook including a first deferred transmission of a first HARQ codebook in response to the first SPS PDSCH, the first HARQ codebook having a physical layer (L1) high priority, and a second deferred transmission of a second HARQ codebook in response to the second SPS PDSCH, the second HARQ codebook having a physical layer (L1) low priority, wherein the first HARQ codebook and the second HARQ codebook are sequenced in the combined HARQ codebook based on a timing of a first initial SPS PUCCH and a second initial SPS PUCCH.

Aspect 22: The method of Aspect 21, in which the first HARQ codebook and the second HARQ codebook are appended to a third HARQ codebook that follows an SPS configuration with respect to HARQ timing.

Aspect 23: A method of wireless communication by a base station, comprising: transmitting, to a user equipment (UE), a first semi-persistently scheduled (SPS) physical downlink shared channel (PDSCH); transmitting, to the UE, a second SPS PDSCH; receiving, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority; and jointly decoding the first HARQ codebook and the second HARQ codebook of the combined HARQ codebook based on a physical layer (L1) priority level of the combined HARQ codebook.

Aspect 24: An apparatus for wireless communication by a user equipment (UE), comprising: a memory; and at least one processor coupled to the memory, the at least one processor configured: to defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; to schedule transmission of a second HARQ codebook at the target PUCCH, the second HARQ codebook having a physical layer (L1) low priority; and to multiplex the first HARQ codebook and the second HARQ codebook to generate a combined HARQ codebook for transmission in the target PUCCH.

Aspect 25: The apparatus of Aspect 24, in which the second HARQ codebook is deferred to the target PUCCH due to potential collision of a second initial SPS PUCCH with a second downlink symbol.

Aspect 26: The apparatus of Aspect 24 or 25, in which the combined HARQ codebook includes the first HARQ codebook and the second HARQ codebook in a sequence based on a timing of the first initial SPS PUCCH and the second initial SPS PUCCH.

Aspect 27: The apparatus of Aspect 24, in which the second HARQ codebook follows an SPS configuration with respect to HARQ timing.

Aspect 28: The apparatus of any of the Aspects 24 or 27, in which the combined HARQ codebook includes the first HARQ codebook, appended after the second HARQ codebook.

Aspect 29: The apparatus of any of the Aspects 24-28, in which the combined HARQ codebook includes the first HARQ codebook with the physical layer (L1) high priority, followed by the second HARQ codebook with the physical (L1) low priority.

Aspect 30: The apparatus of any of the Aspects 24-28, in which the combined HARQ codebook includes the second HARQ codebook with the physical layer (L1) low priority, followed by the first HARQ codebook with the physical layer (L1) high priority.

Aspect 31: The apparatus of any of the Aspects 24-30, in which the at least one processor is further configured to jointly coding the first HARQ codebook and the second HARQ codebook of the combined HARQ codebook based on the physical layer (L1) high priority of the combined HARQ codebook.

Aspect 32: The apparatus of any of the Aspects 24-31, in which the at least one processor is further configured: to defer transmission of a third HARQ codebook, due to potential collision of a third initial SPS PUCCH with a third downlink symbol, until a second target PUCCH, the third HARQ codebook having the physical layer (L1) low priority; to schedule transmission of a fourth HARQ codebook at the second target PUCCH, the fourth HARQ codebook having the physical layer (L1) low priority; and to multiplex the third HARQ codebook and the fourth HARQ codebook to generate a second combined HARQ codebook for transmission in the second target PUCCH, wherein the second combined HARQ codebook has the physical layer (L1) low priority due to inclusion of no HARQ codebooks with the physical layer (L1) high priority.

Aspect 33: A non-transitory computer-readable medium having program code recorded thereon, the program code executed by a processor and comprising: program code to defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; program code to schedule transmission of a second HARQ codebook at the target PUCCH, the second HARQ codebook having a physical layer (L1) low priority; and program code to multiplex the first HARQ codebook and the second HARQ codebook to generate a combined HARQ codebook for transmission in the target PUCCH.

Aspect 34: An apparatus for wireless communication by a user equipment (UE), comprising: means for deferring transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; means for scheduling transmission of a second HARQ codebook at the target PUCCH, the second HARQ codebook having a physical layer (L1) low priority; and means for multiplexing the first HARQ codebook and the second HARQ codebook to generate a combined HARQ codebook for transmission in the target PUCCH.

Aspect 35: The apparatus of Aspect 34, in which the second HARQ codebook is deferred to the target PUCCH due to potential collision of a second initial SPS PUCCH with a second downlink symbol.

Aspect 36: The apparatus of Aspect 34 or 35, in which the combined HARQ codebook includes the first HARQ codebook and the second HARQ codebook in a sequence based on a timing of the first initial SPS PUCCH and the second initial SPS PUCCH.

Aspect 37: The apparatus of the Aspects 34, in which the second HARQ codebook follows an SPS configuration with respect to HARQ timing.

Aspect 38: The apparatus of Aspects 34 or 36, in which the combined HARQ codebook includes the first HARQ codebook, appended after the second HARQ codebook.

Aspect 39: The apparatus of any of the Aspects 34-38, in which the combined HARQ codebook includes the first HARQ codebook with the physical layer (L1) high priority, followed by the second HARQ codebook with the physical (L1) low priority.

Aspect 40: The apparatus of any of the Aspects 34-38, in which the combined HARQ codebook includes the second HARQ codebook with the physical layer (L1) low priority, followed by the first HARQ codebook with the physical layer (L1) high priority.

Aspect 41: The apparatus of any of the Aspects 34-40, further comprising means for jointly coding the first HARQ codebook and the second HARQ codebook of the combined HARQ codebook based on the physical layer (L1) high priority of the combined HARQ codebook.

Aspect 42: The apparatus of any of the Aspects 34-41, further comprising: means for deferring transmission of a third HARQ codebook, due to potential collision of a third initial SPS PUCCH with a third downlink symbol, until a second target PUCCH, the third HARQ codebook having the physical layer (L1) low priority; means for scheduling transmission of a fourth HARQ codebook at the second target PUCCH, the fourth HARQ codebook having the physical layer (L1) low priority; and means for multiplexing the third HARQ codebook and the fourth HARQ codebook to generate a second combined HARQ codebook for transmission in the second target PUCCH, wherein the second combined HARQ codebook has the physical layer (L1) low priority due to inclusion of no HARQ codebooks with the physical layer (L1) high priority.

Aspect 43: An apparatus for wireless communication by a user equipment (UE), comprising: a memory; and at least one processor coupled to the memory, the at least one processor configured: to defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; to defer transmission of a second HARQ codebook, due to potential collision of a second initial SPS PUCCH with a second downlink symbol, until the target PUCCH, the second HARQ codebook having a physical layer (L1) low priority; to multiplex the first HARQ codebook and the second HARQ codebook to generate a combined HARQ codebook for transmission in the target PUCCH; and to sequence the first HARQ codebook and the second HARQ codebook in the combined HARQ codebook based on a timing of the first initial SPS PUCCH and the second initial SPS PUCCH.

Aspect 44: The apparatus of Aspect 43, in which the at least one first processor is further configured to append the first HARQ codebook and the second HARQ codebook to a third HARQ codebook that follows an SPS configuration with respect to HARQ timing.

Aspect 45: A non-transitory computer-readable medium having program code recorded thereon, the program code executed by a processor and comprising: program code to defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; program code to defer transmission of a second HARQ codebook, due to potential collision of a second initial SPS PUCCH with a second downlink symbol, until the target PUCCH, the second HARQ codebook having a physical layer (L1) low priority; program code to multiplex the first HARQ codebook and the second HARQ codebook to generate a combined HARQ codebook for transmission in the target PUCCH; and program code to sequence the first HARQ codebook and the second HARQ codebook in the combined HARQ codebook based on a timing of the first initial SPS PUCCH and the second initial SPS PUCCH.

Aspect 46: An apparatus for wireless communication by a user equipment (UE), comprising: means for deferring transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; means for deferring transmission of a second HARQ codebook, due to potential collision of a second initial SPS PUCCH with a second downlink symbol, until the target PUCCH, the second HARQ codebook having a physical layer (L1) low priority; means for multiplexing the first HARQ codebook and the second HARQ codebook to generate a combined HARQ codebook for transmission in the target PUCCH; and means for sequencing the first HARQ codebook and the second HARQ codebook in the combined HARQ codebook based on a timing of the first initial SPS PUCCH and the second initial SPS PUCCH.

Aspect 47: The apparatus of Aspect 46, further comprising means for appending the first HARQ codebook and the second HARQ codebook to a third HARQ codebook that follows an SPS configuration with respect to HARQ timing.

Aspect 48: An apparatus for wireless communication by a user equipment (UE), comprising: a memory; and at least one processor coupled to the memory, the at least one processor configured: to defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; to schedule transmission of a second HARQ codebook at the target PUCCH, the second HARQ codebook having a physical layer (L1) low priority; to multiplex the first HARQ codebook and the second HARQ codebook to generate a combined HARQ codebook for transmission in the target PUCCH; and to jointly coding the first HARQ codebook and the second HARQ codebook of the combined HARQ codebook based on a physical layer (L1) priority level of the combined HARQ codebook.

Aspect 49: A non-transitory computer-readable medium having program code recorded thereon, the program code executed by a processor and comprising: program code to defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; program code to schedule transmission of a second HARQ codebook at the target PUCCH, the second HARQ codebook having a physical layer (L1) low priority; program code to multiplex the first HARQ codebook and the second HARQ codebook to generate a combined HARQ codebook for transmission in the target PUCCH; and program code to jointly coding the first HARQ codebook and the second HARQ codebook of the combined HARQ codebook based on a physical layer (L1) priority level of the combined HARQ codebook.

Aspect 50: An apparatus for wireless communication by a user equipment (UE), comprising: means for deferring transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority; means for scheduling transmission of a second HARQ codebook at the target PUCCH, the second HARQ codebook having a physical layer (L1) low priority; means for multiplexing the first HARQ codebook and the second HARQ codebook to generate a combined HARQ codebook for transmission in the target PUCCH; and means for jointly coding the first HARQ codebook and the second HARQ codebook of the combined HARQ codebook based on a physical layer (L1) priority level of the combined HARQ codebook.

Aspect 51: An apparatus for wireless communication by a base station, comprising: a memory; and at least one processor coupled to the memory, the at least one processor configured: to transmit, to a user equipment (UE) a first semi-persistently scheduled (SPS) physical downlink shared channel (PDSCH); to transmit, to the UE, a second SPS PDSCH; and to receive, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority.

Aspect 52: The apparatus of Aspect 51, in which the first HARQ codebook is deferred due to potential collision of a first initial SPS physical uplink control channel (PUCCH) with a first downlink symbol, and the second HARQ codebook is deferred due to potential collision of a second initial SPS PUCCH with a second downlink symbol.

Aspect 53: The apparatus of Aspect 51 or 52, in which the combined HARQ codebook includes the first HARQ codebook and the second HARQ codebook in a sequence based on a timing of the first initial SPS PUCCH and the second initial SPS PUCCH.

Aspect 54: The apparatus of Aspect 51, in which the second HARQ codebook follows an SPS configuration with respect to HARQ timing.

Aspect 55: The apparatus of any of the Aspects 51 or 54, in which the combined HARQ codebook includes the first HARQ codebook, appended after the second HARQ codebook.

Aspect 56: The apparatus of any of the Aspects 51-55, in which the combined HARQ codebook includes the first HARQ codebook with the physical layer (L1) high priority, followed by the second HARQ codebook with the physical (L1) low priority.

Aspect 57: The apparatus of any of the Aspects 51-55, in which the combined HARQ codebook includes the second HARQ codebook with the physical layer (L1) low priority, followed by the first HARQ codebook with the physical layer (L1) high priority.

Aspect 58: The apparatus of any of the Aspects 51-57, in which the at least one processor is further configured to jointly decoding the first HARQ codebook and the second HARQ codebook of the combined HARQ codebook based on the physical layer (L1) high priority of the combined HARQ codebook.

Aspect 59: A non-transitory computer-readable medium having program code recorded thereon, the program code executed by a processor and comprising: program code to transmit, to a user equipment (UE) a first semi-persistently scheduled (SPS) physical downlink shared channel (PDSCH); program code to transmit, to the UE, a second SPS PDSCH; and program code to receive, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority.

Aspect 60: An apparatus for wireless communication by a base station, comprising: means for transmitting, to a user equipment (UE), a first semi-persistently scheduled (SPS) physical downlink shared channel (PDSCH); means for transmitting, to the UE, a second SPS PDSCH; and means for receiving, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority.

Aspect 61: The apparatus of Aspect 60, in which the first HARQ codebook is deferred due to potential collision of a first initial SPS physical uplink control channel (PUCCH) with a first downlink symbol, and the second HARQ codebook is deferred due to potential collision of a second initial SPS PUCCH with a second downlink symbol.

Aspect 62: The apparatus of Aspect 60 or 61, in which the combined HARQ codebook includes the first HARQ codebook and the second HARQ codebook in a sequence based on a timing of the first initial SPS PUCCH and the second initial SPS PUCCH.

Aspect 63: The apparatus of Aspect 60, in which the second HARQ codebook follows an SPS configuration with respect to HARQ timing.

Aspect 64: The apparatus of any of the Aspects 60 or 63, in which the combined HARQ codebook includes the first HARQ codebook, appended after the second HARQ codebook.

Aspect 65: The apparatus of any of the Aspects 60-64, in which the combined HARQ codebook includes the first HARQ codebook with the physical layer (L1) high priority, followed by the second HARQ codebook with the physical (L1) low priority.

Aspect 66: The apparatus of any of the Aspects 60-64, in which the combined HARQ codebook includes the second HARQ codebook with the physical layer (L1) low priority, followed by the first HARQ codebook with the physical layer (L1) high priority.

Aspect 67: The apparatus of any of the Aspects 60-66, further comprising means for jointly decoding the first HARQ codebook and the second HARQ codebook of the combined HARQ codebook based on the physical layer (L1) high priority of the combined HARQ codebook.

Aspect 68: An apparatus for wireless communication by a base station, comprising: a memory; and at least one processor coupled to the memory, the at least one processor configured: to transmit, to a user equipment (UE) a first semi-persistently scheduled (SPS) physical downlink shared channel (PDSCH); to transmit, to the UE, a second SPS PDSCH; and to receive, from the UE, a combined hybrid automatic repeat request (HARQ) codebook including a first deferred transmission of a first HARQ codebook in response to the first SPS PDSCH, the first HARQ codebook having a physical layer (L1) high priority, and a second deferred transmission of a second HARQ codebook in response to the second SPS PDSCH, the second HARQ codebook having a physical layer (L1) low priority, wherein the first HARQ codebook and the second HARQ codebook are sequenced in the combined HARQ codebook based on a timing of a first initial SPS PUCCH and a second initial SPS PUCCH.

Aspect 69: The apparatus of Aspect 68, in which the first HARQ codebook and the second HARQ codebook are appended to a third HARQ codebook that follows an SPS configuration with respect to HARQ timing.

Aspect 70: A non-transitory computer-readable medium having program code recorded thereon, the program code executed by a processor and comprising: program code to transmit, to a user equipment (UE) a first semi-persistently scheduled (SPS) physical downlink shared channel (PDSCH); program code to transmit, to the UE, a second SPS PDSCH; and program code to receive, from the UE, a combined hybrid automatic repeat request (HARQ) codebook including a first deferred transmission of a first HARQ codebook in response to the first SPS PDSCH, the first HARQ codebook having a physical layer (L1) high priority, and a second deferred transmission of a second HARQ codebook in response to the second SPS PDSCH, the second HARQ codebook having a physical layer (L1) low priority, wherein the first HARQ codebook and the second HARQ codebook are sequenced in the combined HARQ codebook based on a timing of a first initial SPS PUCCH and a second initial SPS PUCCH.

Aspect 71: An apparatus for wireless communication by a base station, comprising: means for transmitting, to a user equipment (UE), a first semi-persistently scheduled (SPS) physical downlink shared channel (PDSCH); means for transmitting, to the UE, a second SPS PDSCH; and means for receiving, from the UE, a combined hybrid automatic repeat request (HARQ) codebook including a first deferred transmission of a first HARQ codebook in response to the first SPS PDSCH, the first HARQ codebook having a physical layer (L1) high priority, and a second deferred transmission of a second HARQ codebook in response to the second SPS PDSCH, the second HARQ codebook having a physical layer (L1) low priority, wherein the first HARQ codebook and the second HARQ codebook are sequenced in the combined HARQ codebook based on a timing of a first initial SPS PUCCH and a second initial SPS PUCCH.

Aspect 72: The apparatus of Aspect 71, in which the first HARQ codebook and the second HARQ codebook are appended to a third HARQ codebook that follows an SPS configuration with respect to HARQ timing.

Aspect 73: An apparatus for wireless communication by a base station, comprising: a memory; and at least one processor coupled to the memory, the at least one processor configured: to transmit, to a user equipment (UE) a first semi-persistently scheduled (SPS) physical downlink shared channel (PDSCH); to transmit, to the UE, a second SPS PDSCH; to receive, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority; and to jointly decoding the first HARQ codebook and the second HARQ codebook of the combined HARQ codebook based on a physical layer (L1) priority level of the combined HARQ codebook.

Aspect 74: A non-transitory computer-readable medium having program code recorded thereon, the program code executed by a processor and comprising: program code to transmit, to a user equipment (UE) a first semi-persistently scheduled (SPS) physical downlink shared channel (PDSCH); program code to transmit, to the UE, a second SPS PDSCH; program code to receive, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority; and program code to jointly decoding the first HARQ codebook and the second HARQ codebook of the combined HARQ codebook based on a physical layer (L1) priority level of the combined HARQ codebook.

Aspect 75: An apparatus for wireless communication by a base station, comprising: means for transmitting, to a user equipment (UE), a first semi-persistently scheduled (SPS) physical downlink shared channel (PDSCH); means for transmitting, to the UE, a second SPS PDSCH; means for receiving, from the UE, a combined hybrid automatic repeat request (HARQ) codebook including a deferred transmission of a first HARQ codebook in response to the first SPS PDSCH, the first HARQ codebook having a physical layer (L1) high priority, and a second HARQ codebook in response to the second SPS PDSCH, the second HARQ codebook having a physical layer (L1) low priority; and means for jointly decoding the first HARQ codebook and the second HARQ codebook of the combined HARQ codebook based on a physical layer (L1) priority level of the combined HARQ codebook.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
deferring transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority;
scheduling transmission of a second HARQ codebook at the target PUCCH, the second HARQ codebook having a physical layer (L1) low priority;
multiplexing the first HARQ codebook and the second HARQ codebook to generate a combined HARQ codebook for transmission in the target PUCCH; and
assigning a priority to the combined HARQ codebook in accordance with presence of a high priority bit in the combined HARQ codebook.

2. The method of claim 1, in which the second HARQ codebook is deferred to the target PUCCH due to potential collision of a second initial SPS PUCCH with a second downlink symbol.

3. The method of claim 2, in which the combined HARQ codebook includes the first HARQ codebook and the second HARQ codebook in a sequence based on a timing of the first initial SPS PUCCH and the second initial SPS PUCCH.

4. The method of claim 1, in which the second HARQ codebook follows an SPS configuration with respect to HARQ timing.

5. The method of claim 4, in which the combined HARQ codebook includes the first HARQ codebook, appended after the second HARQ codebook, which is regularly scheduled.

6. The method of claim 1, in which the combined HARQ codebook includes the first HARQ codebook with the physical layer (L1) high priority, followed by the second HARQ codebook with the physical (L1) low priority.

7. The method of claim 1, in which the combined HARQ codebook includes the second HARQ codebook with the physical layer (L1) low priority, followed by the first HARQ codebook with the physical layer (L1) high priority.

8. The method of claim 1, further comprising jointly coding the first HARQ codebook and the second HARQ codebook of the combined HARQ codebook based on the physical layer (L1) high priority of the combined HARQ codebook.

9. The method of claim 1, further comprising:
deferring transmission of a third HARQ codebook, due to potential collision of a third initial SPS PUCCH with a third downlink symbol, until a second target PUCCH, the third HARQ codebook having the physical layer (L1) low priority;
scheduling transmission of a fourth HARQ codebook at the second target PUCCH, the fourth HARQ codebook having the physical layer (L1) low priority; and
multiplexing the third HARQ codebook and the fourth HARQ codebook to generate a second combined HARQ codebook for transmission in the second target PUCCH, wherein the second combined HARQ codebook has the physical layer (L1) low priority due to inclusion of no HARQ codebooks with the physical layer (L1) high priority.

10. A method of wireless communication by a user equipment (UE), comprising:
deferring transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority;
deferring transmission of a second HARQ codebook, due to potential collision of a second initial SPS PUCCH with a second downlink symbol, until the target PUCCH, the second HARQ codebook having a physical layer (L1) low priority;
multiplexing the first HARQ codebook and the second HARQ codebook to generate a combined HARQ codebook for transmission in the target PUCCH;
assigning a priority to the combined HARQ codebook in accordance with presence of a high priority bit in the combined HARQ codebook; and
sequencing the first HARQ codebook and the second HARQ codebook in the combined HARQ codebook based on a timing of the first initial SPS PUCCH and the second initial SPS PUCCH.

11. The method of claim 10, further comprising appending the first HARQ codebook and the second HARQ codebook to a third HARQ codebook that follows an SPS configuration with respect to HARQ timing.

12. An apparatus for wireless communication by a user equipment (UE), comprising:
a memory; and
at least one processor coupled to the memory, the at least one processor configured:
to defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority;
to schedule transmission of a second HARQ codebook at the target PUCCH, the second HARQ codebook having a physical layer (L1) low priority;
to multiplex the first HARQ codebook and the second HARQ codebook to generate a combined HARQ codebook for transmission in the target PUCCH; and
to assign a priority to the combined HARQ codebook in accordance with presence of a high priority bit in the combined HARQ codebook.

13. The apparatus of claim 12, in which the second HARQ codebook is deferred to the target PUCCH due to potential collision of a second initial SPS PUCCH with a second downlink symbol.

14. The apparatus of claim 13, in which the combined HARQ codebook includes the first HARQ codebook and the second HARQ codebook in a sequence based on a timing of the first initial SPS PUCCH and the second initial SPS PUCCH.

15. The apparatus of claim 12, in which the second HARQ codebook follows an SPS configuration with respect to HARQ timing.

16. The apparatus of claim 15, in which the combined HARQ codebook includes the first HARQ codebook, appended after the second HARQ codebook.

17. The apparatus of claim 12, in which the combined HARQ codebook includes the first HARQ codebook with the physical layer (L1) high priority, followed by the second HARQ codebook with the physical (L1) low priority.

18. The apparatus of claim 12, in which the combined HARQ codebook includes the second HARQ codebook with the physical layer (L1) low priority, followed by the first HARQ codebook with the physical layer (L1) high priority.

19. The apparatus of claim 12, in which the at least one processor is further configured to jointly coding the first HARQ codebook and the second HARQ codebook of the combined HARQ codebook based on the physical layer (L1) high priority of the combined HARQ codebook.

20. The apparatus of claim 12, in which the at least one processor is further configured:
to defer transmission of a third HARQ codebook, due to potential collision of a third initial SPS PUCCH with a third downlink symbol, until a second target PUCCH, the third HARQ codebook having the physical layer (L1) low priority;
to schedule transmission of a fourth HARQ codebook at the second target PUCCH, the fourth HARQ codebook having the physical layer (L1) low priority; and
to multiplex the third HARQ codebook and the fourth HARQ codebook to generate a second combined HARQ codebook for transmission in the second target PUCCH, wherein the second combined HARQ codebook has the physical layer (L1) low priority to the due to inclusion of no HARQ codebooks with the physical layer (L1) high priority.

21. An apparatus for wireless communication by a user equipment (UE), comprising:
a memory; and
at least one processor coupled to the memory, the at least one processor configured:

to defer transmission of a first hybrid automatic repeat request (HARQ) codebook, due to potential collision of a first initial semi-persistently scheduled (SPS) physical uplink control channel (PUCCH) with a first downlink symbol, until a target PUCCH, the first HARQ codebook having a physical layer (L1) high priority;

to defer transmission of a second HARQ codebook, due to potential collision of a second initial SPS PUCCH with a second downlink symbol, until the target PUCCH, the second HARQ codebook having a physical layer (L1) low priority;

to multiplex the first HARQ codebook and the second HARQ codebook to generate a combined HARQ codebook for transmission in the target PUCCH;

to assign a priority to the combined HARQ codebook in accordance with presence of a high priority bit in the combined HARQ codebook; and to sequence the first HARQ codebook and the second HARQ codebook in the combined HARQ codebook based on a timing of the first initial SPS PUCCH and the second initial SPS PUCCH.

22. The apparatus of claim 21, in which the at least one processor is further configured to append the first HARQ codebook and the second HARQ codebook to a third HARQ codebook that follows an SPS configuration with respect to HARQ timing.

* * * * *